US 6,555,988 B2

United States Patent
Masaki et al.

(10) Patent No.: US 6,555,988 B2
(45) Date of Patent: Apr. 29, 2003

(54) MOTOR CONTROL DEVICE

(75) Inventors: Ryoso Masaki, Hitachi (JP); Satoru Kaneko, Urizura-machi (JP); Sanshiro Obara, Tokai-mura (JP); Mitsuyuki Hombu, Hitachinaka (JP); Yoshimi Sakurai, Hitachioota (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/726,595

(22) Filed: Dec. 1, 2000

(65) Prior Publication Data

US 2001/0002784 A1 Jun. 7, 2001

(30) Foreign Application Priority Data

Dec. 2, 1999 (JP) .......................................... 11-342943

(51) Int. Cl.[7] .............................. H02P 6/18; H02P 21/00
(52) U.S. Cl. ........................ 318/721; 318/254; 318/701
(58) Field of Search ................................ 318/138, 254, 318/439, 700, 701, 720, 721, 722, 724

(56) References Cited

U.S. PATENT DOCUMENTS

| | | | | |
|---|---|---|---|---|
| 5,448,149 A | * | 9/1995 | Ehsani et al. | 318/701 |
| 5,652,495 A | * | 7/1997 | Narazaki et al. | 318/716 |
| 5,821,713 A | | 10/1998 | Holling et al. | |
| 5,903,129 A | | 5/1999 | Okuno et al. | |
| 5,982,117 A | * | 11/1999 | Taylor et al. | 318/254 |
| 5,994,870 A | * | 11/1999 | Kaneko et al. | 318/798 |
| 6,153,956 A | * | 11/2000 | Branecky | 310/68 B |
| 6,281,656 B1 | * | 8/2001 | Masaki et al. | 318/700 |

FOREIGN PATENT DOCUMENTS

| | | |
|---|---|---|
| AT | 397440 | 4/1994 |
| AT | 399602 | 6/1995 |
| JP | A 7-245981 | 9/1995 |
| JP | A 8-205578 | 8/1996 |
| JP | A 11-69884 | 3/1999 |
| JP | A 11-150983 | 6/1999 |

OTHER PUBLICATIONS

C. Spiteri Staines, et al., "A Periodic Burst Injection method for deriving Rotor Position Saturated Cage–Salient Induction Motors without a Shaft Encoder" Industry Applications Conference, 1998.

A. B. Kulkarni, et al., "A novel position sensor elimination technique for the interior permanent–magnet synchronous motor drive" Article No. XP010090882, p. 775, 1989.

S. Ogasawara, et al., "An approach to real–time position estimation at zero and low speed for a PM motor based on saliency" Industry Applications Conference, 1996.

Aihara et al., "Sensor–less Torque Control of Salient–Pole Synchronous Motor at Zero Speed Operation", JIASC '96 (Japanese Electrical Engineering Society), Paper No. 170, 1996.

* cited by examiner

Primary Examiner—Bentsu Ro
(74) Attorney, Agent, or Firm—Crowell & Moring LLP

(57) ABSTRACT

In an arrangement having an electric power inverter 2 which applies a voltage to an AC motor 1 and a control unit 4 which calculates a voltage command value applied in PWM signals, detection use voltages Vup, Vvp and Vwp are applied in synchronism with PWM signal generation use carrier waves in the control unit 4 as well as motor currents iv and iv are detected in response to current detection pulses Pd in synchronism therewith. In a magnetic pole position detection unit 12, counter electromotive forces of the synchronous motor 1 are estimated from a relationship between the detection use voltages Vup, Vvp and Vwp and current difference vectors of the motor current to determine a magnetic pole position θ through calculation. The determined magnetic pole position θ is inputted to coordinate conversion units 8 and 11 and a motor speed detection unit 13. Thereby, a motor control device having a control characteristic of a good response property with no magnetic pole position sensor is provided for a control system of a synchronous motor.

13 Claims, 17 Drawing Sheets

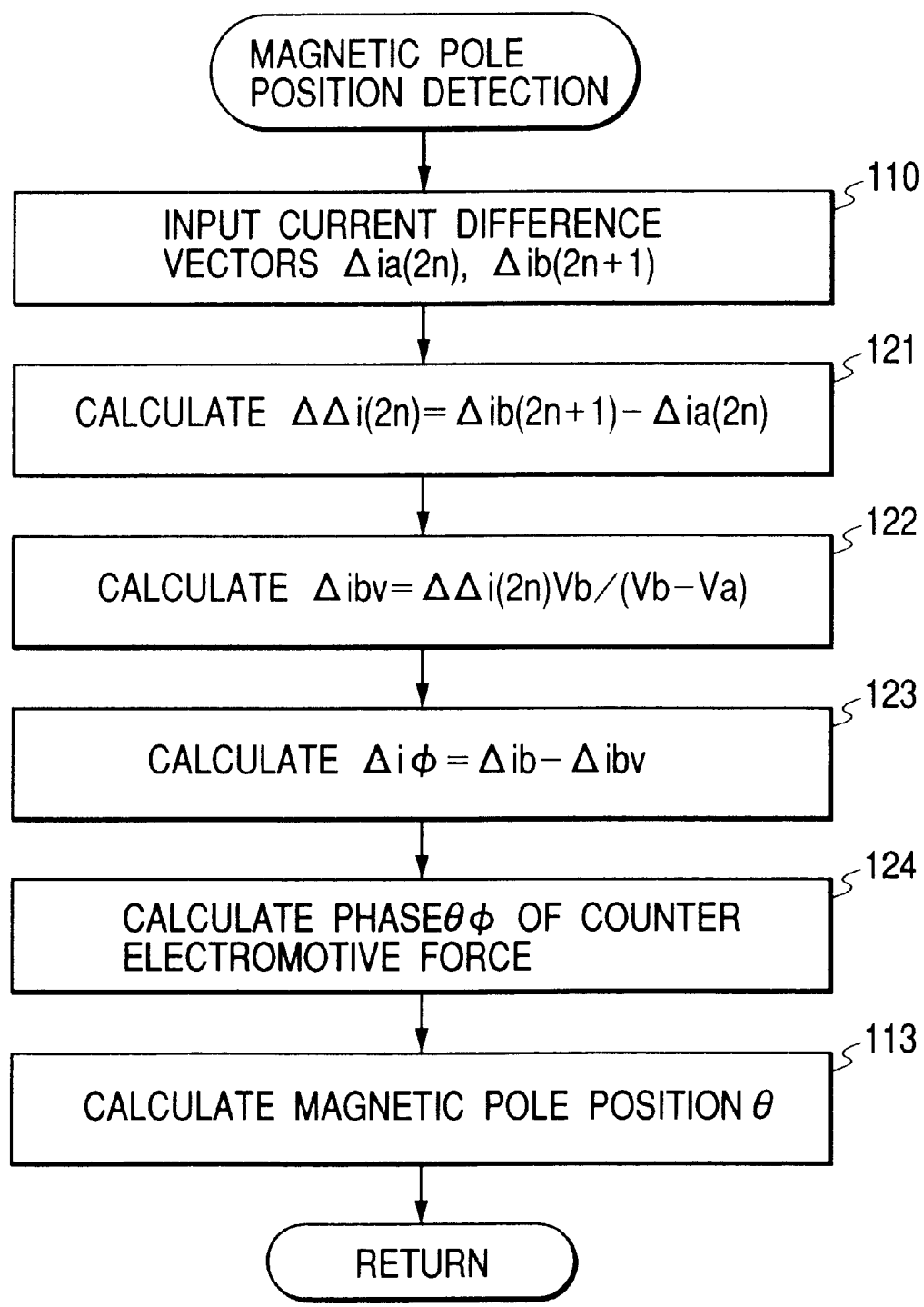

MOTOR CONTROL DEVICE

BACKGROUND OF THE INVENTION

1. Field of the Invention

The present invention relates to a motor control device which controls a synchronous motor including a reluctance motor with a high performance, and, in particular, relates to a motor control device which performs the control with a sensorless manner.

2. Conventional Art

In order to control such as speed and torque of a synchronous motor, it is necessary to detect or estimate its magnetic pole position. Thus, such as speed and torque of the synchronous motor can be controlled by performing a current control or a voltage control thereof based on the detected magnetic pole position.

Recently, methods of controlling a synchronous motor with no magnetic pole position sensor has been proposed.

A first method thereof is disclosed, for example, in JP-A-7-245981 (1995) and in a paper No. 170 at Heisei 8th National Meeting of Industrial Application Division for Japan Electrical Engineering's Society, which relates to a method of estimating the magnetic pole position based on a parallel motor current component and an orthogonal motor current component (current components in rotary coordinate system) in response to AC voltage application, and is characterized in that the detection of a magnetic pole position at a standstill and during a low speed rotation of the motor can be realized without using a magnetic pole position sensor.

A second method of superposing an additional voltage is disclosed, for example, in JP-A-11-150983 (1999) and JP-A-11-69884 (1999) in which method an additional voltage is applied so as to prevent magnetic flux saturation even in a high torque region, thereby, sensorless detection of a magnetic pole position is realized in a range from a low load to a heavy load at a standstill or during a low speed rotation.

Further, a third method is, for example, disclosed in JP-A-8-205578 (1996) in which a salient pole property of a synchronous motor is detected from a correlation between a voltage vector applied to the synchronous motor through a pulse width modulation control (PWM control) and a motor current ripple component (in vector amount) corresponding thereto. Further, since the third method utilizes usual PWM signals for controlling the synchronous motor, an advantage is obtained that no additional signals for the detection is required.

However, when detecting the magnetic pole position with the first method while driving the motor, it is necessary to extract a current having the same frequency component as that of an AC voltage used for the detection through such as a band pass filter using a notch filter and a Fourier integration. In particular, when the motor rpm increases, separation between motor input frequencies and AC voltage frequencies used for the detection becomes difficult, thus, a problem is posed that a stable motor drive at a high rpm is difficult. Further, the method requires a measure so as not to be affected by the switching characteristic of the invertor concerned. Namely, in contrast to the carrier wave frequencies of PWM signals which are from several kHz to 20 kHz, the frequencies of the AC voltage used for the detection are low at about several 100 Hz, therefore, noises of several 100 Hz may be generated when the motor is driving.

The second method is intended to improve performance when the motor is driven from a standstill condition or at a low speed rotating condition, however, the timing of current detection and the relation with the PWM signals which become important for a high speed drive of the motor are not disclosed as well as no measures for realizing the position detection with a high accuracy are disclosed.

Further, in order to realize the third method it is necessary to detect correlation between the motor current condition and the applied voltage every time when the PWM signals vary. Namely, it is the base requirement that the detection of the motor current condition and recognition of the applied voltage condition have to be performed at least six times for every one cycle of the carrier waves which requires a high performance controller.

SUMMARY OF THE INVENTION

A first object of the present invention is to provide a motor control device which estimates a magnetic detection of motor current over a broad range from a standstill condition to a high speed rotating condition while using a non-expensive controller and controls a synchronous motor including a reluctance motor with a high response characteristic.

A second object of the present invention is to provide a high performance motor control device which can compensate a current follow-up property based on counter electromotive force information even if the motor speed varies.

According to the present invention, a motor control device is provided with an AC motor, an electric power inverter which applies a voltage to the AC motor and a control unit which controls the applied voltage with PWM signals in synchronism with carrier waves, wherein a magnetic pole position on a rotor of the AC motor is estimated through detection of current in the AC motor in synchronism with the carrier waves. For example, in a synchronous motor having a salient characteristic a current in the motor is detected while varying the applied voltage for every half cycle of the carrier waves and a current difference vector (a vector in static coordinate system) for the every half cycle is determined. Subsequently difference of twice current difference vectors (hereinbelow called as current difference difference vector) and difference corresponding to twice applied voltage vectors (hereinbelow called as voltage difference vector) are calculated, and the applied voltage (voltage difference vector) is controlled so that the phase difference thereof assumes 0. When the phase difference is rendered 0 with the above method, the phase of the voltage difference vector assumes the direction (d-axis) of the magnetic pole position, thereby, a magnetic pole position sensorless control can be realized. Since the change of the applied voltage is performed for every half cycle of the carrier waves, only the phase of the PWM signals is shifted which prevents generation of noises. Further, since the current is detected in synchronism with the carrier waves, the average values of the applied voltages for respective phases are accurately recognized which provides a characteristic that the relation between the applied voltage and the current difference can be detected in a short time represented by the carrier wave cycle. For this reason, the present invention is effective for sensorless approach in a field of motor control requiring a high response property.

Further, through the use of information on the current difference vector the counter electromotive force of the synchronous motor can be detected accurately. By making use of the thus detected counter electromotive force a counter electromotive force compensation in the current control system is effected, thereby, a control system having a good current follow-up property is constituted in comparison with the conventional compensation of counter electromotive force which was estimated from the speed.

Through the detection of current in synchronism with the carrier wave cycle, the inventers found out a variety of methods of detecting the magnetic pole position other than the above explained which will be explained below in detail.

BRIEF DESCRIPTION OF THE DRAWINGS

FIG. 12 is a flowchart for explaining processings performed in a magnetic pole position estimation unit 30 in FIG. 11 embodiment;

DETAILED DESCRIPTION OF THE EMBODIMENTS

Hereinbelow, an embodiment of the present invention will be explained with reference to FIG. 1. The present embodiment relates to a method in which a magnetic pole position is detected by making use of a counter electromotive force of a synchronous motor 1.

Figure 1:
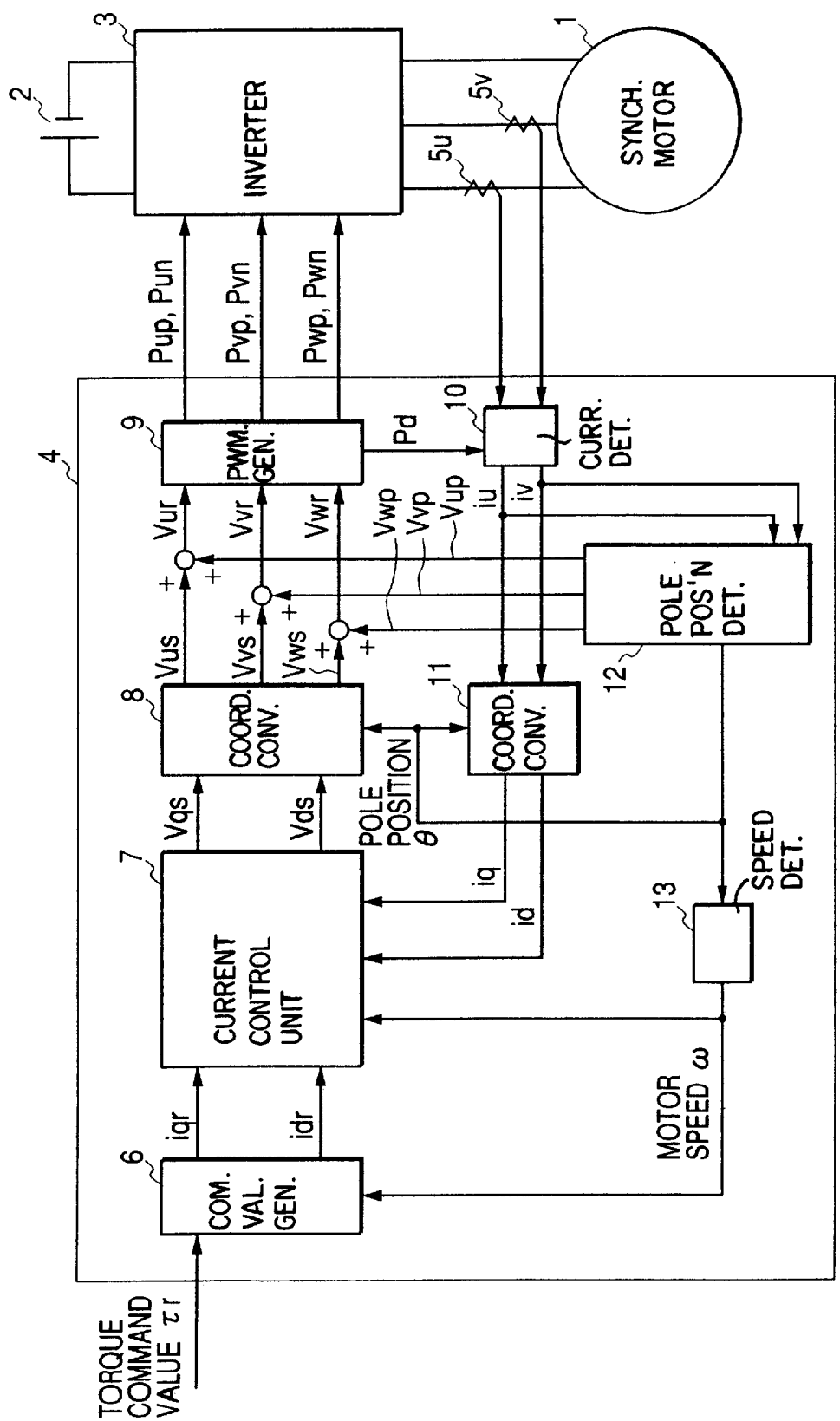
FIG. 1 is a system diagram showing one embodiment to which the present invention is applied which detects a magnetic pole position of a synchronous motor by detecting current variation in the synchronous motor in synchronism with carrier waves for generating PWM signals.

FIG. 1 is a block diagram of a motor control system in which the synchronous motor 1 is driven with DC energy from a battery 2. A DC voltage of the battery 2 is inverted by an inverter 3 into three phase AC voltage which is applied to the synchronous motor 1. The applied voltage is determined by a controller 4 after performing the following calculation. At first, in a current command value generating unit 6 d-axis current command value idr and q-axis current command value iqr are determined with respect to a torque command value τr to be generated by the motor 1. Herein, d-axis designates the direction of magnetic pole position (magnetic fluxes) and q-axis designates the direction electrically orthogonal to the d-axis and with both of which d-q axis coordinate system is constituted. In the synchronous motor 1, the ratio of idr and iqr can be varied under the condition of the same motor speed ω and the same motor torque τ being generated, although motor loss thereof varies. Therefore, when a motor speed ω is inputted to the current command value generating unit 6, optimum idr and iqr which show a minimum motor loss with respect to a torque command value τr are designed to be outputted. Further, the motor speed ω is detected in a speed detection unit 13 based on a variation amount of magnetic pole position θ which will be explained later.

When a rotor with a magnet rotates, the d-q axis coordinate system also rotates, therefore, the phase from the static coordinate system (α-β axis coordinate system) is assumed as θ. Namely, the object of the present embodiment is to detect the phase θ of the magnetic pole (hereinbelow called as magnetic pole position θ) from a current. If d-axis current and q-axis current can be controlled in an alignment with the command values, the synchronous motor 1 can generate a torque to meet with the command value τr. Further, the torque command value τr is either commanded directly as illustrated or may be commanded from a speed control calculation circuit (not shown).

Further, U phase current iu and V phase current iv detected by current sensors 5u and 5v are sampled in a current detection unit 10 at the timing of current detection pulses pd which will be explained later, and are converted into d-axis current id and q-axis current iq in d-q axis coordinate system at a coordinate conversion unit 11. In the present embodiment, currents detected in the current detection unit 10 are two phase currents iu and iv for U and V phases, because current iw can be determined from iu and iv, the detection of W phase current iw is omitted. However, the present invention is of course applicable when all of the three phase currents are detected. In a current control unit 7, d-axis current deviation between d-axis current command value idr and d-axis current id and q-axis current deviation between q-axis current command value iqr and q-axis current iq are calculated, and d-axis voltage command value Vds and q-axis voltage command value Vqs for the respective current deviation are obtained through proportion and integration control calculation. Further, as a control method of compensating counter electromotive force a method of performing a non-interfering control making use of motor speed ω has also been proposed. In a coordinate conversion unit 8 to which d-axis voltage command value Vds and q-axis voltage command value Vqs are inputted, three phase voltage command value Vus, Vvs and Vws for the static coordinate system are calculated according to magnetic pole position θ. The three phase voltage command values are respectively added to detection use voltage command values Vup, Vvp and Vwp outputted from a magnetic pole position detection unit 12 which will be explained later, and are inputted to a PWM signal generating unit 9. Through calculation in the PWM signal generating unit 9 three phase PWM pulses Pup, Pvp, Pwp, Pun, Pvn and Pwn are outputted to the inverter 3. Thereby, a voltage to be applied to the synchronous motor 1 is determined.

Figure 2:
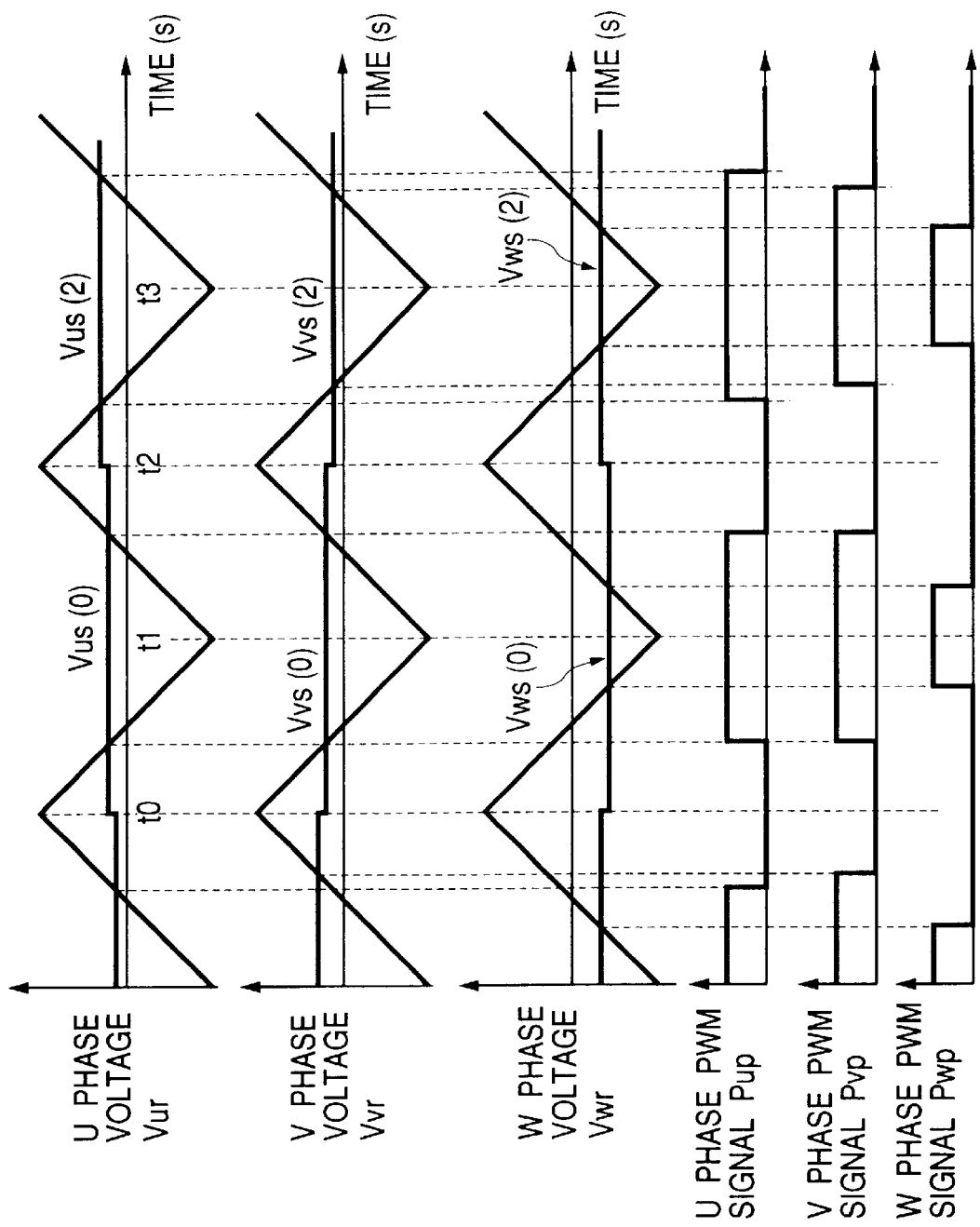
FIG. 2 is a time chart showing a relationship between carrier waves when generating conventional PWM signals and the PWM signals.

Processing contents of the PWM signal generating unit 9 when the detection use voltage command values are Vup=Vvp=Pwp=0 will be explained. Through comparison of the waveforms of the respective phase voltage command values Vur, Vvr and Vwr with saw teeth carrier waves, the three phase PWM pulses Pup, Pvp and Pwp can be obtained. Further, when a short circuiting prevention period is neglected, the PWM pulses Pun, Pvn and Pwn are respectively inversions of Pup, Pvp and Pwp, therefore, an explanation on the PWM pulses Pun, Pvn and Pwn is omitted. When duty of a PWM pulse exceeds over 50%, the average output voltage thereof assumes 0 or a positive value and when the duty is below 50%, the average output voltage assumes a negative value. In FIG. 2, the voltage command values Vur, Vvr and Vwr are renewed at the time when the carrier waves assume their maximum values (for example, at time t(2n), t(2n+2)). The PWM pulses Pup, Pvp and Pwp between times t(2n) and t(2n+2) show respectively symmetric shapes with respect to time t(2n+1), therefore, the average values of the applied voltages for the respective phase from time t(2n) to time t(2n+2) are equal to those from time t(2n+1) to time t(2n+2).

Figure 3:
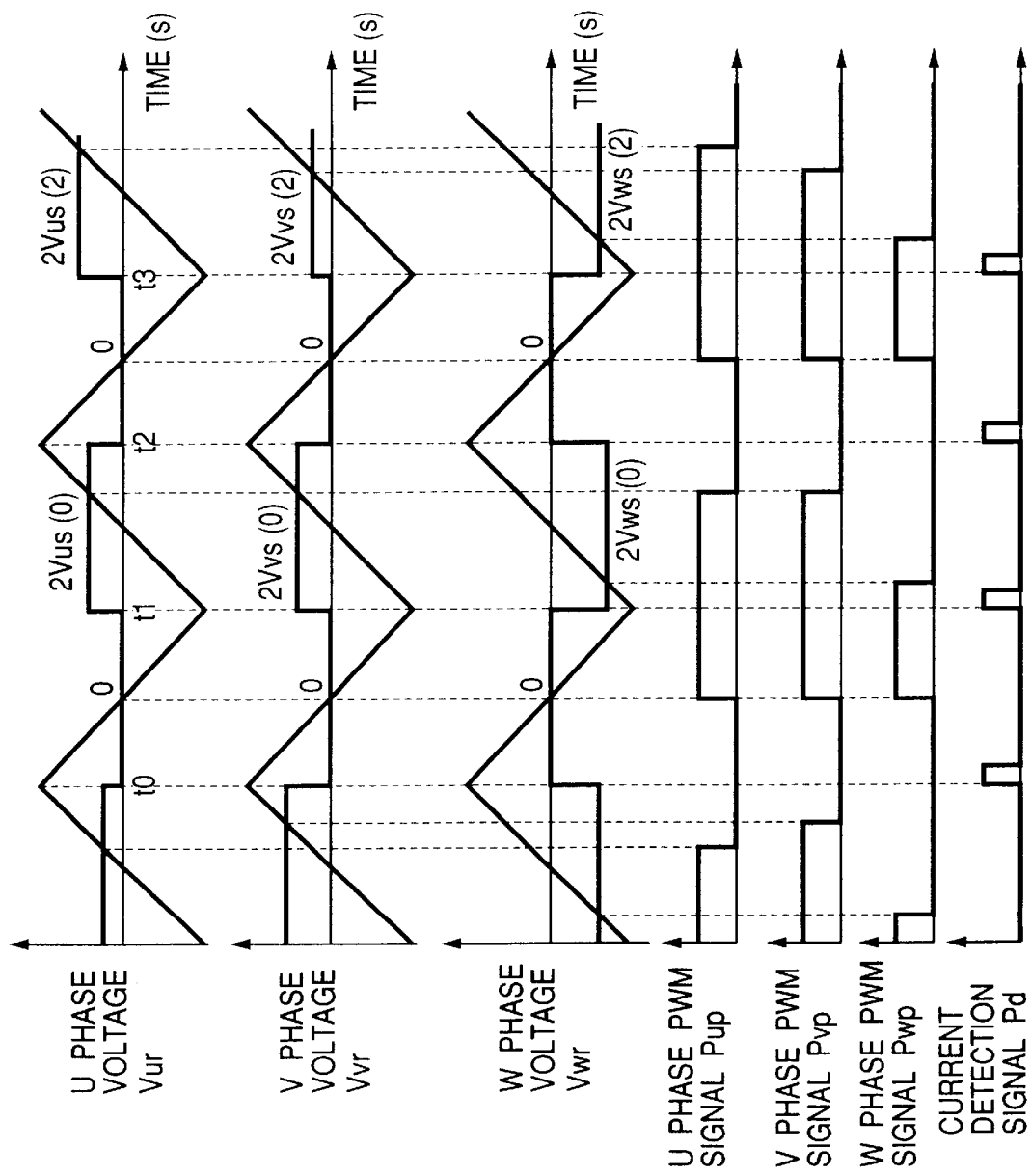
FIG. 3 is a time chart showing a relationship between three phase voltage command values, carrier wave signals and PWM signals for detecting current difference values under three phase short circuit condition, and a timing of current sampling according to the present invention.
Figure 4:
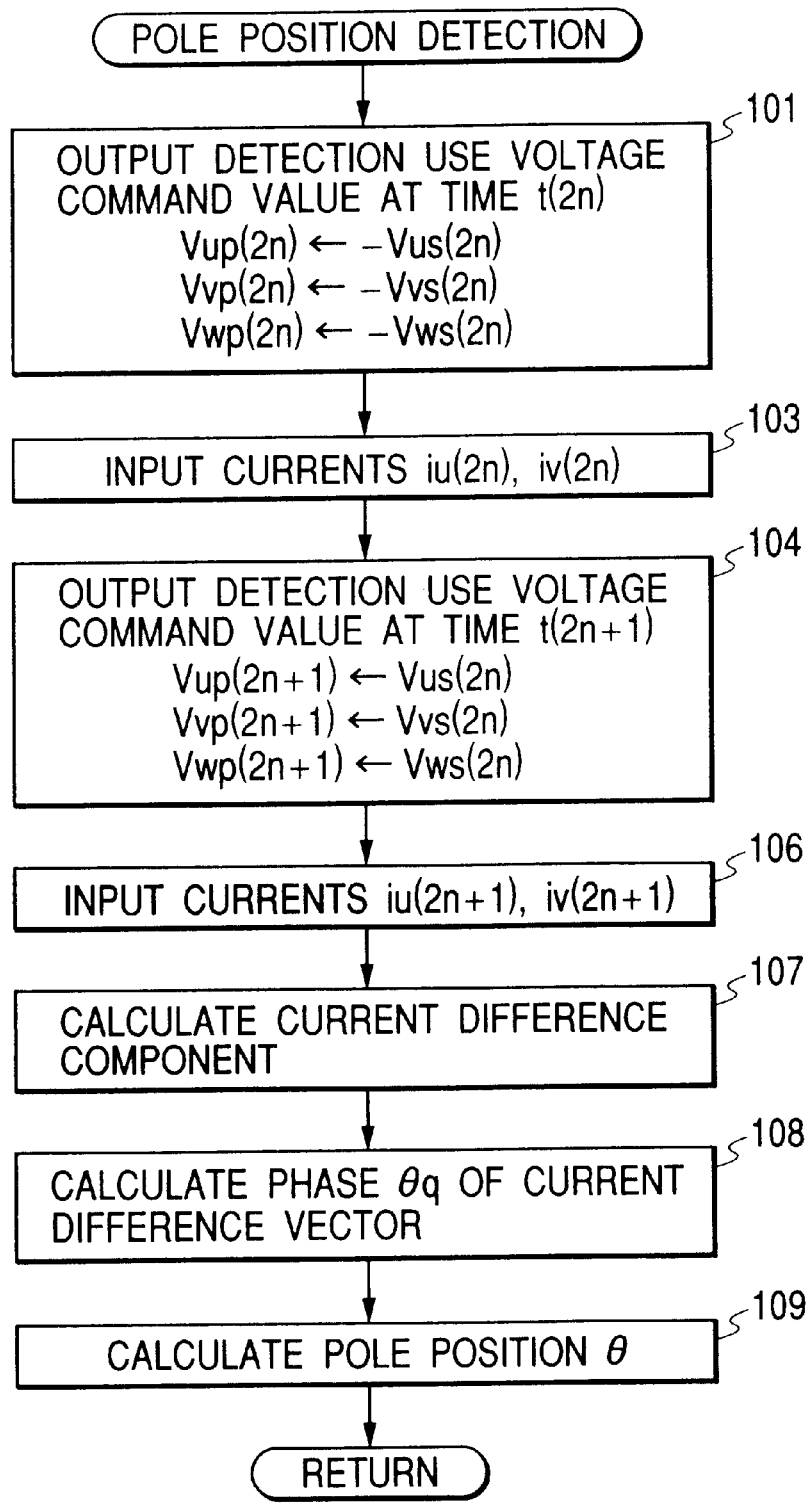
FIG. 4 is a flowchart showing a calculation method for detecting a magnetic pole position in FIG. 1 embodiment.

Now the magnetic pole position detection unit 12 which is one of important elements in FIG. 1 embodiment will be explained. The magnetic pole position detection unit 12 is inputted of the U phase current iu and the V phase current iv and output the detection use voltage command values Vup, Vvp and Vwp according to flowchart as shown in FIG. 4 as well as calculates the magnetic pole position θ based on iu and iv. A processing method performed in the magnetic pole position detection unit 12 will be explained with reference to FIG. 4. At step 101, as detection use voltage command values Vup(2n), Vvp(2n) and Vwp(2n) from time t(2n) to time t(2n+1), −Vus(2n), −Vvs(2n) and −Vws(2n) are outputted (wherein n is an integer). It is designed that at time t(2n) these values are automatically set and the voltage command values Vur, Vvr and Vwr for respective phases from time t(2n) to time t(2n+1) assume respectively 0. More specifically, the voltage command values in time periods t(2n)~t(2n+1) and t(2n+2)~t(2n+3) in the time chart as shown in FIG. 3 assume 0. Subsequently, at step 103 currents iu(2n) and iv(2n) at time t(2n) are inputted. In FIG. 3, in synchronism with the leading edge of current detection pulses Pd which are generated at times t(2n) and t(2n+2), the detected currents are inputted. At step 104, as the detection use voltage command values Vup(2n+1), Vvp(2n+1) and Vwp(2n+1) from time t(2n+1) to time t(2n+2), Vus(2n), Vvs(2n) and Vws(2n) are respectively outputted. In FIG. 3, it is implied that the voltage command values in the time period t(2n+1)~t(2n+2) are respectively 2Vus(2n), 2Vvs(2n) and 2Vws(2n). When performing these controls, average values of the voltage command values in the time period t(2n)~t(2n+2) assume Vus(2n), Vvs(2n) and Vws (2n), and it is obtained that although the phases of the PWM pulses Pup, Pvp and Pwp vary from those in FIG. 2, but the pulse widths thereof are equal to those in FIG. 2. Namely, it is equivalent that a control of shifting phases of the PWM pulses is performed. Although the detection use voltage command values are added, the present embodiment shows a characteristic that no substantial influence is affected to the current control performance. Further, there was a problem conventionally that when detection use AC voltage is applied, noises are generated, however, since the detection use voltage command values are controlled for every half cycle of the carrier waves in synchronism therewith, the present embodiment shows a characteristic that no noises exceeding those caused by the normal PWM switching are generated.

At step 106, currents iu(2n+1) and iv(2n+1) at time t(2n+1) are inputted. Subsequently, at step 107 variation amounts of respective phase currents iu(2n+1)~iu(2n), iv(2n+1)~iv(2n), namely current difference values Δiu(2n) and Δiv(2n) from time t(2n) to time (2n+1) are determined. At the subsequent step 108, phase θq of the current difference vector Δi(2n) is obtained from the current difference values Δiu(2n) and Δiv(2n). The applied voltages at time period t(2n)~t(2n+1) are the same for the respective phases, in that assume zero voltage vector state. Herein, it is assumed that a current difference vector Δi(2n) of the synchronous motor 1 varies by its counter electromotive force, the phase of the current difference vector Δi(2n) assumes in negative direction in q-axis. Accordingly, the phase advanced by π/2 [rad] with respect to the phase θq of the current difference vector Δi corresponds to the magnetic pole position, therefore, at step 109, the magnetic pole position θ is determined by adding π/2 [rad] to the phase θq. Namely, through the control of shifting the respective PWM pulses the magnetic pole position detection can be realized only with the current changes in the half cycle of the carrier waves, therefore, the advantages that the magnetic pole position is rapidly detected without increasing noises. Further, it is unnecessary to use motor parameters including those of a synchronous motor having a salient pole characteristic, therefore, a further advantage that the magnetic pole position can be detected further accurately. Still further, when it is required to take into account of a dead time, the applied voltage can be adjusted so to assume zero voltage vector depending on the current directions of the respective phases.

Figure 5:
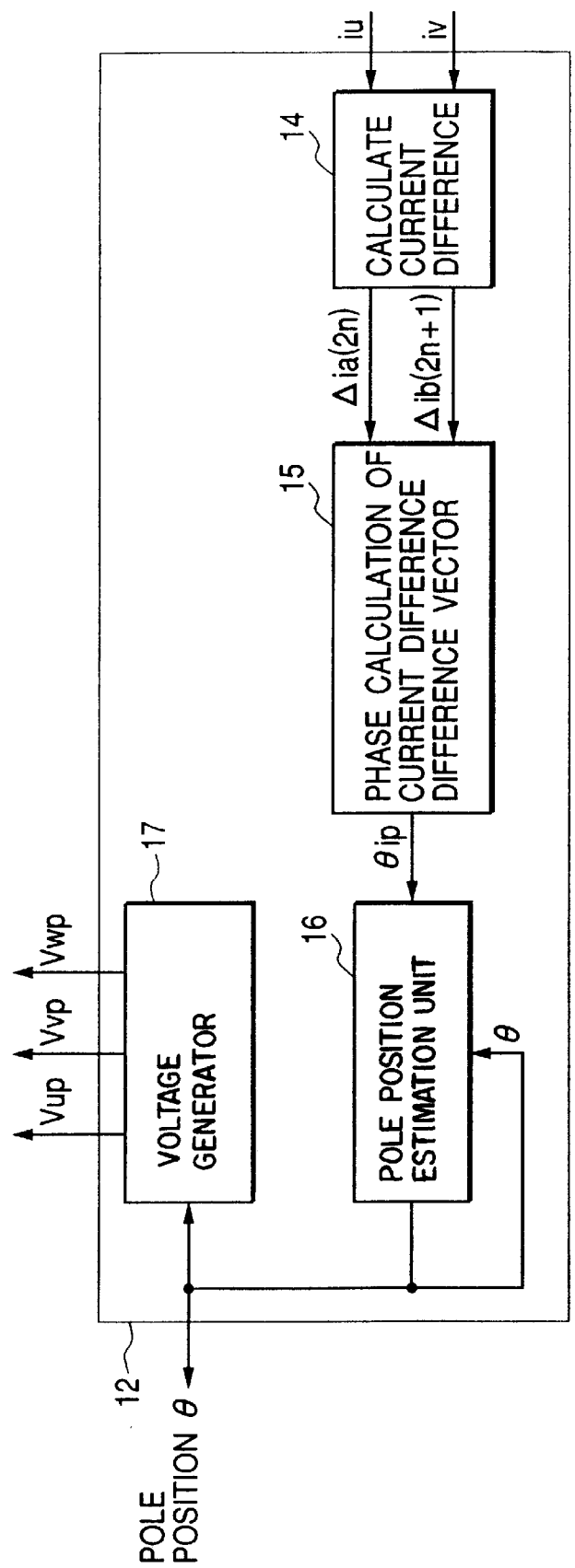
FIG. 5 is a control block diagram showing a modification of a magnetic pole position detection unit 12 in FIG. 1 embodiment.

FIG. 5 is a modification of the magnetic pole position detection unit 12 which is effective when a synchronous motor 1 has an inverted salient pole characteristic (which implies that d-axis inductance is smaller than q-axis inductance). The magnetic pole position detection unit 12 as shown in FIG. 5 is constituted by a current difference calculation unit 14, a current difference difference vector phase calculation unit 15, a magnetic pole position estimation unit 16 and a detection use voltage generation unit 17. At first, in the detection use voltage generation unit 17 the detection use voltage command values Vup(2n), Vvp(2n) and Vwp(2n) from time t(2n) to time t(2n+1) are calculated according to the following equations (1)-(3) and the calculation results are outputted therefrom;

$$Vup(2n)=V0\cos(\theta vp(2n)) \quad (1)$$

$$Vvp(2n)=V0\cos(\theta vp(2n)+2\pi/3) \quad (2)$$

$$Vwp(2n)=V0\cos(\theta vp(2n)+4\pi/3) \quad (3)$$

wherein, $\theta vp(2n)$ is an output at time t(2n) from the magnetic pole position estimation unit 16. Accordingly, the vector phase of the detection use voltage command value is $\theta vp(2n)$. Subsequently, the detection use voltage command values Vup(2n+1), Vvp(2n+1) and Vwp(2n+1) from time t(2n+1) to time t(2n+2) are calculated according to the following equations (4)-(6) and the calculation results are outputted from the detection use voltage generation unit 17;

$$Vup(2n+1)=V0\cos(\theta vp(2n)+\pi) \quad (4)$$

$$Vvp(2n+1)=V0\cos(\theta vp(2n)+5\pi/3) \quad (5)$$

$$Vwp(2n+1)=V0\cos(\theta vp(2n)+\pi/3) \quad (6)$$

The vector phase of the detection use voltage command value at this instance is $\theta vp(2n)+\pi$, namely directs to the opposite direction as the vector phase of the detection use voltage command value from time t(2n) to time t(2n+1).

In the current difference calculation unit 14, current difference values $\Delta iu(2n)$ and $\Delta iv(2n)$ from time 2(2n) to time t(2n+1) are respectively calculated from the currents iu(2n) and iv(2n) at time t(2n) and the currents iu(2n+1) and iv(2n+1) at time t(2n+1), and a current difference vector $\Delta ia(2n)$ is determined according to these calculated values. Further, current difference values $\Delta iu(2n+1)$ and $\Delta iv(2n+1)$ from time t(2n+1) to time t(2n+2) are calculated from currents iu(2n+1) and iv(2n+1) at time t(2n+1) and currents iu(2n+2) and iv(2n+2) at time t(2n+2) and the current difference vector $\Delta ib(2n+1)$ is determined according to these calculated values. The difference between the current difference vector $\Delta ib(2n+1)$ and the current difference vector $\Delta ia(2n)$ is the current difference difference vector $\Delta \Delta i(2n)$, and its phase $\theta ip(2n)$ is calculated in the current difference difference vector phase calculation unit 15. It is to be noted that both the current difference vector and the current difference difference vector are values in the static coordinate system of which importance will be explained later.

The magnetic pole position estimation unit 16 performs a control so as to make the vector phase $\theta vp(2n)$ of the detection use voltage command value come close to the phase $\theta ip(2n)$ of the current difference difference vector $\Delta \Delta i(2n)$. Through this control when the phase $\theta ip$ stably coincides with the phase $\theta vp$, the phase $\theta vp$ assumes d-axis, namely corresponds to the magnetic pole position $\theta$. Further, if the phase of d-axis varies more than several times during one cycle of the carrier waves (namely, in a case that the motor speed $\omega$ is high), a control of correcting the phase depending on motor speed $\omega$ is performed.

Figure 6B:
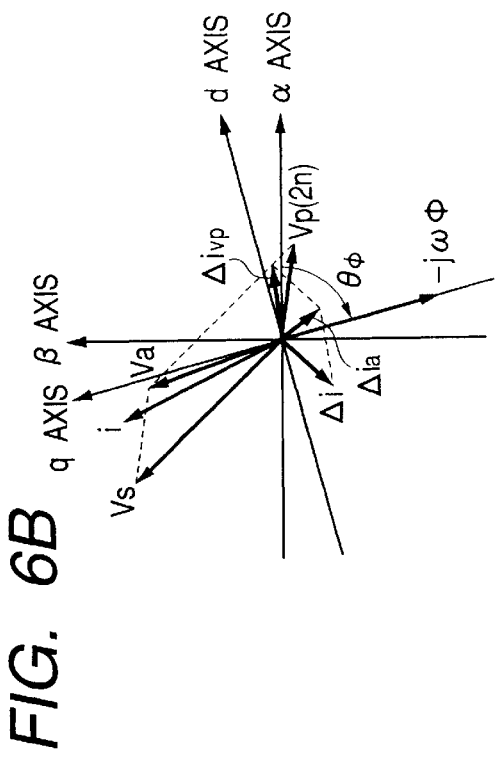
FIGS. 6A through 6D are current and voltage vector diagrams of a synchronous motor for explaining the principle of magnetic pole position detection in FIG. 5 modification.
Figure 6D:
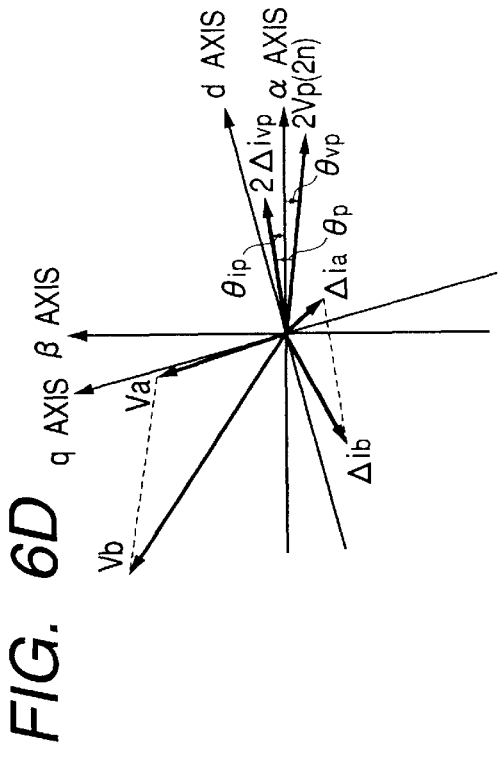
Figure 6A:
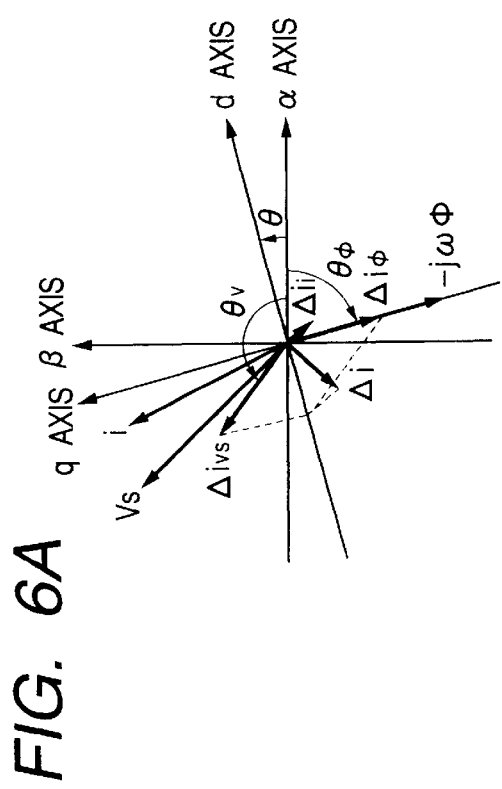

The control performed in FIG. 5 modification will be explained with reference to vector diagrams as shown in FIGS. 6A through 6D. FIG. 6A shows the state of current difference vector when only the three phase voltage command values Vus, Vvs and Vws outputted from the coordinate conversion unit 8 are applied to the synchronous motor 1, in that the voltage vector Vs(2n) from time t(2n) to time t(2n+2) corresponds to the three phase voltage command values Vus, Vvs and Vws. The current difference vector $\Delta i(2n)$ is a vector sum of a first current difference vector $\Delta ivs(2n)$, a second current difference vector $\Delta i\phi(2n)$ and a third current difference vector $\Delta ii(2n)$ of which component are respectively affected by the voltage vector Vs(2n), the counter electromotive force vector $-j\omega\phi(2n)$ and the current vector i(2n). The second current differential vector $\Delta i\phi(2n)$ assumes the same phase as the counter electromotive force vector $-j\omega\phi(2n)$ regardless to whether or not the synchronous motor 1 shows a salient pole characteristic (including a reverse salient pole characteristic). Further, when the interval from time t(2n) to time t(2n+1) is short in comparison with the time constant of the circuit in the synchronous motor 1, the third current difference vector $\Delta ii(2n)$ is small in comparison with other current difference vectors and can be assumed as 0. When the phase of the voltage vector Vs(2n) is neither directed to d-axis direction nor to q-axis direction, the phase of the first current differential vector $\Delta ivs(2n)$ does not coincide with the phase of the voltage vector Vs(2n) due to the salient pole characteristic of the synchronous motor 1. As has been explained hitherto, since the current difference vector $\Delta i(2n)$ is affected by the voltage vector Vs(2n) and the counter electromotive force vector $-j\omega\phi(2n)$, it is difficult to detect the magnetic pole position under this condition.

Figure 6C:
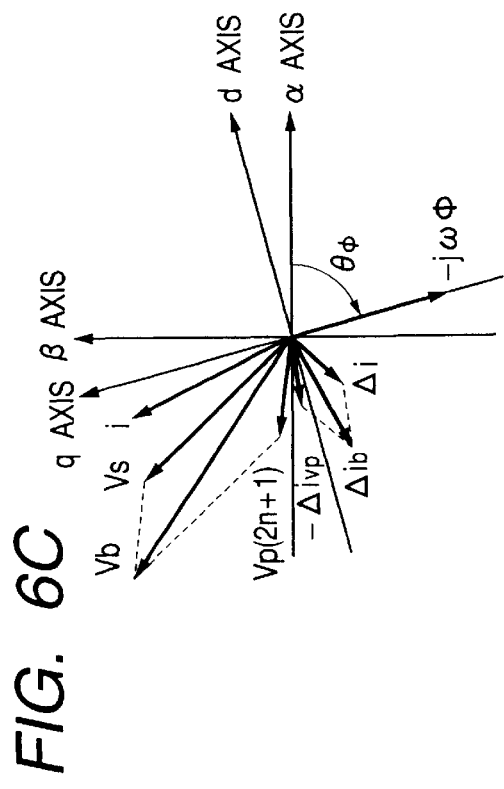

Therefore, during the time from t(2n) to t(2n+1) Va(2n) representing a vector sum of the voltage vector Vs(2n) and the detection use voltage vector Vp(2n) is applied as shown in the vector diagram in FIG. 6B. The detected current difference vector $\Delta ia(2n)$ represents the vector sum of the current difference vector $\Delta ivp(2n)$ induced by the detection use voltage vector Vp(2n) and the current difference vector $\Delta i(2n)$ as shown in FIG. 6A. During the following interval from time t(2n+1) to time t(2n+2) Vb(2n+1) representing a vector sum of the voltage vector Vs(2n) and the detection use voltage vector Vp(2n+1) is applied as shown in FIG. 6C. Herein as the detection use voltage vector Vp(2n+1) a vector satisfying the following equation is provided;

$$Vp(2n+1)=-Vp(2n) \quad (7)$$

In this instance, the detected current difference vector $\Delta ib(2n+1)$ represents a vector sum of the current difference vector $\Delta ivp(2n+1)$ induced by the detection use voltage vector Vp(2n+1) and the current difference vector $\Delta i(2n+1)$ as shown in FIG. 6A. When magnetic fluxes of the synchronous motor 1 are not saturated, $\Delta ivp(2n+1)$ satisfies the following relationship;

$$\Delta ivp(2n+1)=-\Delta ivp(2n) \quad (8)$$

Further, during the interval from time t(2n) to time t(2n+2) when the motor speed is in a range that the rotation phase of the magnetic pole of the synchronous motor 1 can be treated small, $\Delta i(2n+1)$ in FIG. 6C substantially coincides with $\Delta i(2n)$ in FIG. 6B.

With reference to FIG. 6D, detection of the current difference vector $\Delta ia(2n)$ from time t(2n) to time t(2n+1) and the current difference vector $\Delta ib(2n+1)$ from time t(2n+1) to time t(2n+2) and the purpose of obtaining the current difference difference vector $\Delta \Delta i(2n)$ representing the difference therebetween will be explained. In view of the relationships shown in FIGS. 6B and 6C, it is understood that the difference between $\Delta ia(2n)$ and $\Delta ib(2n+1)$, namely the current difference difference vector $\Delta \Delta i(2n)$ assumes $2\Delta ivp(2n)$. As has been explained previously, $\Delta ivp(2n)$ is a component induced by applying the detection use voltage vector Vp(2n). Herein, it is assumed that the phases of Vp(2n) and Δivp(2n) are respectively θvp(2n) and θip(2n). For a synchronous motor 1 having an inverted salient pole characteristic only when θvp(2n) coincides with either d-axis, θvp (2n) coincides with θip(2n). When θvp(2n) does not coincide with θip(2n), ΔΔi(2n) (herein, indicated as 2Δivp) is placed closer to d-axis than Vp(2n) as shown in FIG. 6D. Therefore, as explained in connection with the magnetic pole position estimation unit 16 as shown in FIG. 5, when the control of shifting θvp(2n) close to θip(2n) is performed, the θvp(2n) stabilizes at d-axis. Further, whether positive or negative direction in d-axis can be estimated with reference to the counter electromotive force direction. When performing the above explained control, a torque control or a speed control of the synchronous motor having an inverted salient pole characteristic can be performed from a standstill condition to a high speed rotation with no magnetic pole position sensor. Moreover, since the magnetic pole position can be detected within one cycle of the carrier waves, it is possible to obtain substantially the same degree of response characteristic as when a magnetic pole position sensor is installed. Further, with regard to a synchronous motor having a salient pole characteristic other than the inverted salient pole characteristic the sensorless control can be performed on the same principle.

Figure 7:
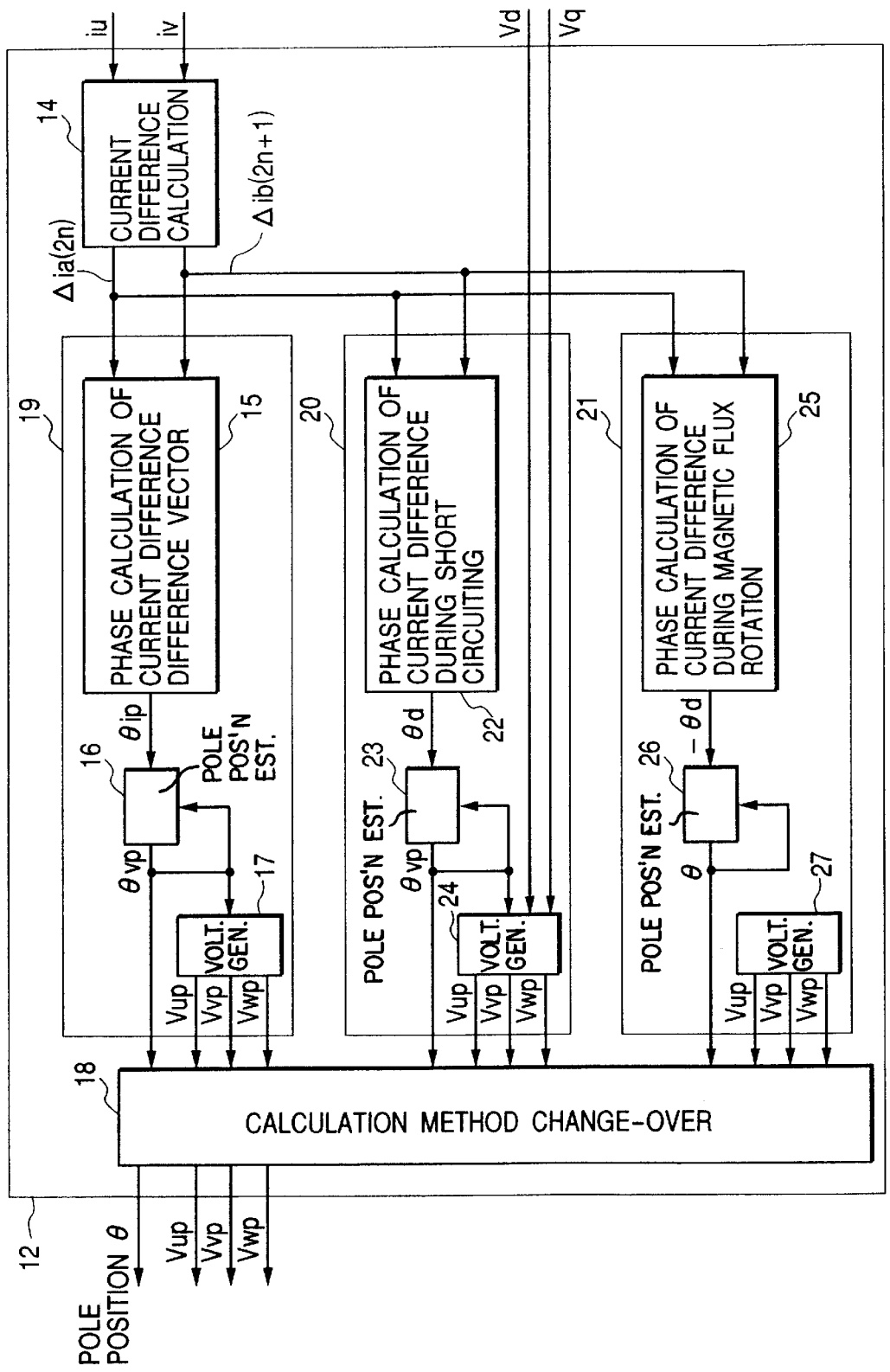
FIG. 7 is a control block diagram showing another modification of a magnetic pole position detection unit 12 in FIG. 1 embodiment which permits selection of a proper calculation method depending on a motor speed.

FIG. 7 is another embodiment of the synchronous motor control which permits to select one of a plurality of methods of detecting a magnetic pole position with no magnetic pole position sensor depending on motor speed ω. In the present embodiment, the overall motor control structure is the same as FIG. 1 embodiment, however, the structure of the magnetic pole position detection unit 12 is modified from those in FIGS. 1 and 5.

FIG. 7 shows a block diagram of the magnetic pole position detection unit 12 which is constituted by a current difference calculation unit 14, a first magnetic pole position detection unit 19, a second magnetic pole position detection unit 20, a third magnetic pole position detection unit 21 and a calculation method change-over unit 18. The current difference calculation unit 14 performs the calculation as explained in FIG. 5 modification. Likely, in the first magnetic pole position detection unit 19 the calculation as explained in connection with FIG. 5 embodiment is performed. Namely, the principle of magnetic pole position estimation by this calculation makes use of the current variation in relation to the salient pole characteristic (or the inverted salient pole characteristic) of the synchronous motor 1, the magnetic pole position detection can be performed from the standstill condition to a medium speed region of the synchronous motor with this calculation method.

On the other hand, the second magnetic pole position detection unit 20 relates to a method of extracting the current difference vector due to the counter electromotive force from information on the applied voltage. The present method is effective for a motor speed range from a medium speed to a high speed.

Further, the third magnetic pole position detection unit 21 relates to an estimation method which makes use of a current difference vector caused by magnetic flux rotation without varying the applied voltage, the present method is particularly effective for magnetic pole position detection at the time of high speed rotation of the motor.

Figure 8:
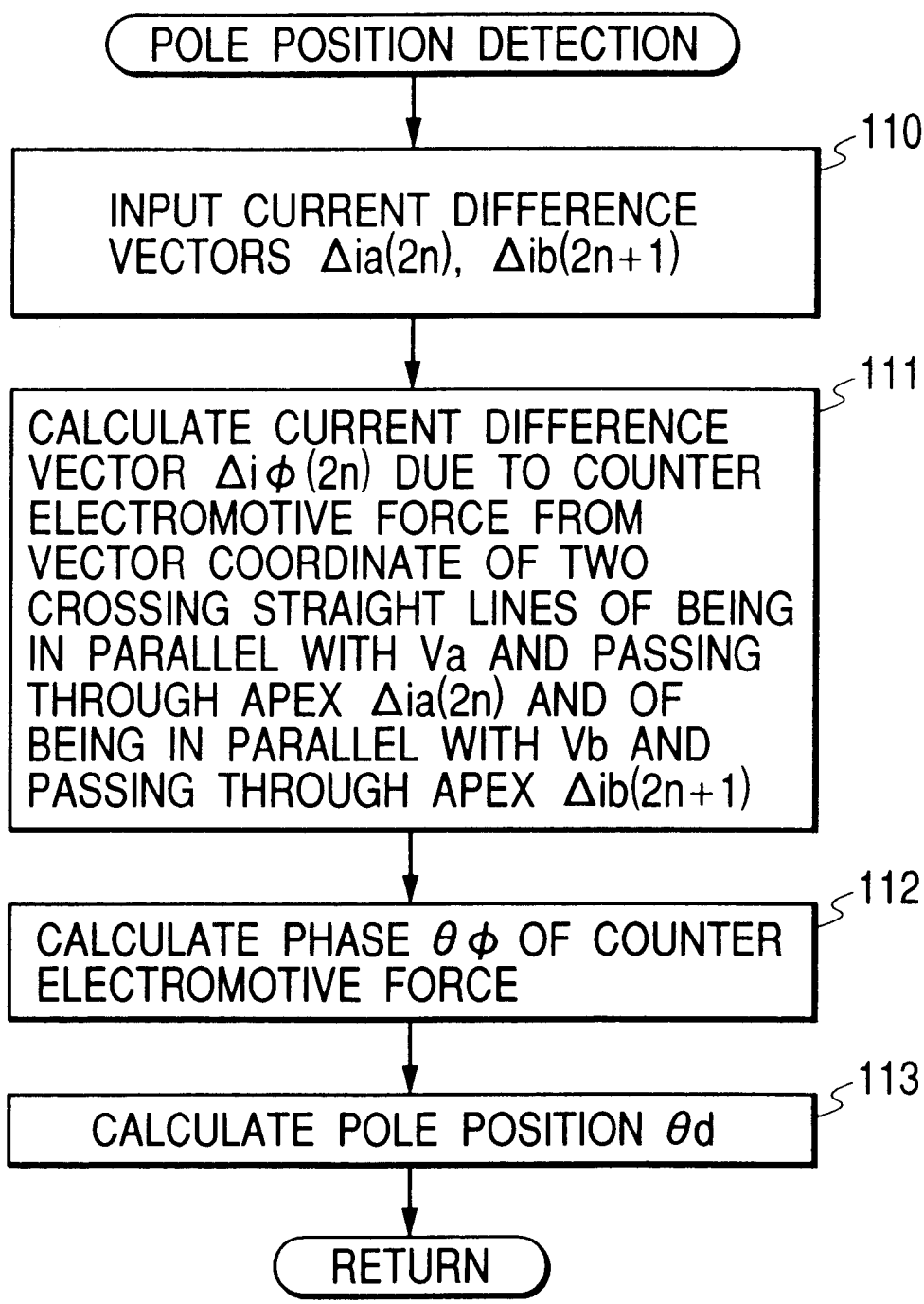
FIG. 8 is a flowchart showing processing contents performed in a second magnetic pole position estimation unit 20 in FIG. 7 modification.
Figure 9A:
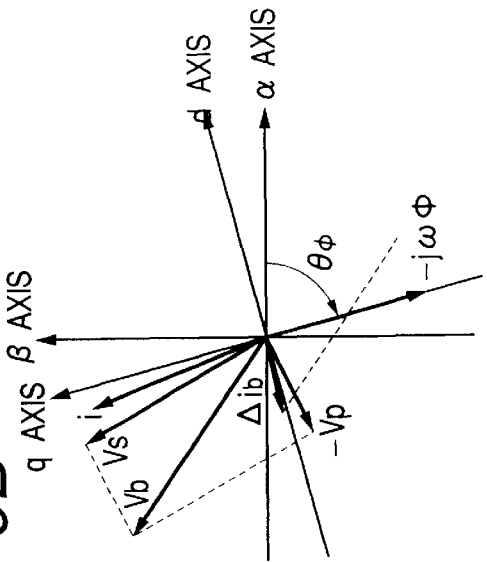
FIGS. 9A through 9C are current and voltage vector diagrams of a synchronous motor explaining a principle of magnetic pole position detection performed in the second magnetic pole position estimation unit 20 as shown in FIG. 7.
Figure 9B:
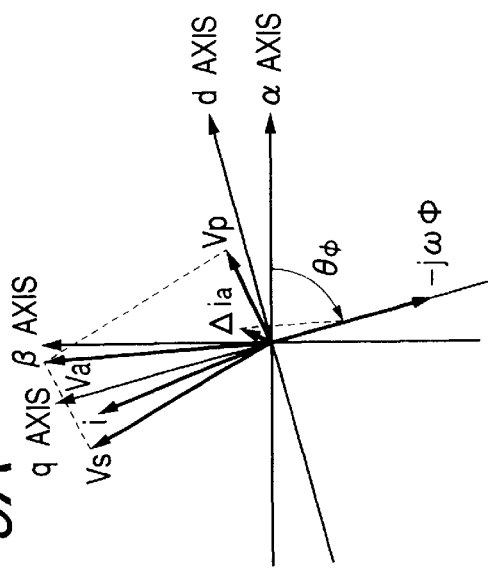
Figure 9C:
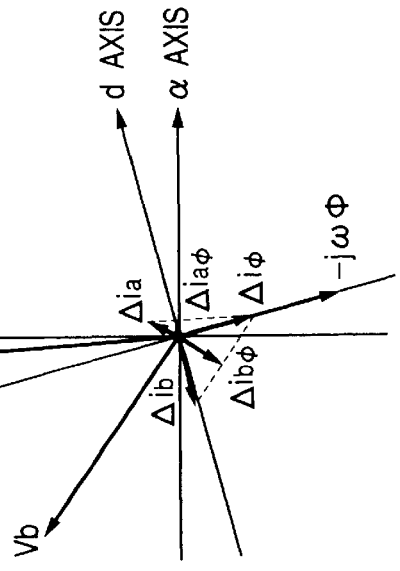

Now, at first the second magnetic pole position calculation unit 20 will be explained, which is constituted by an in-short circuit current difference phase calculation unit 22, a magnetic pole position estimation unit 23 and detection use voltage generation unit 24. The in-short circuit current difference phase calculation unit 22 calculates the phase of the counter electromotive force and estimates the magnetic pole position through performing the calculation as shown in FIG. 8 flowchart. FIGS. 9A through 9C vector diagrams of current and voltage at this instance. At step 110 in FIG. 8, current difference vectors Δia(2n) and Δib(2n+1) are inputted. Δia(2n) is the current difference vector, when a voltage Va(2n) is applied during interval t(2n)~t(2n+1). Like the vector diagram as has been explained in connection with FIG. 6B, Va(2n) is a vector sum of the voltage vector Vs(2n) and the detection use voltage vector Vp(2n) of which relationship is shown in FIG. 9A. Likely, Δib(2n+1) is a current difference vector, when voltage Vb(2n) is applied during interval t(2n+1)~t(2n+2). The applied voltage Vb(2n+1) at this instance is a vector sum of the voltage vector Vs(2n) and the detection use voltage vector −Vp(2n) of which relationship is shown in FIG. 9B. At the subsequent step 111, a current difference vector Δiφ(2n) due to a counter electromotive force is calculated from a vector coordinate defined by two crossing straight lines, one running in parallel with the applied voltage Va(2n) and passing on the apex of Δia(2n) and the other running in parallel with the applied voltage Vb(2n+1) and passing on the apex of Δib (2n+1), of which implication will be explained with reference to FIG. 9C. When the inverted salient pole characteristic is small, a current difference component Δiaq(2n) among the current difference vector Δia(2n) which is orthogonal to the applied voltage Va(2n) is hardly affected by the applied voltage Va(2n). Namely, Δiaq(2n) can be treated mostly as a component of the current difference vector Δiφ(2n) due to the counter electromotive force. Likely, the current difference component Δibq(2n+1) among the current difference vector Δib(2n+1) which is orthogonal to the applied voltage Vb(2n+1) is hardly affected by the applied voltage Vb(2n+1), and can be treated mostly as a component of the current difference vector Δiφ(2n) due to the counter electromotive force. In other words, a component of the current difference vector Δiφ(2n) which is orthogonal to Va(2n) is Δiaq(2n), and another component of Δiφ(2n) which is orthogonal to Vb(2n+1) is Δibq(2n+1). Accordingly, when performing the calculation at step 111, the current difference vector Δiφ(2n) can be determined. At step 112, the phase θφ of Δiφ(2n) is calculated, of which phase is the very phase of the counter electromotive force as has been explained above. Since the phase θφ of the vector Δiφ(2n) corresponds to q-axis (in negative direction) as shown in FIG. 9C, the magnetic pole position θd can be obtained by adding π/2 [rad] to this phase θφ of which calculation is performed at step 113. Thus, the magnetic pole position can be determined based on the counter electromotive force. Further, when the salient pole characteristic of the synchronous motor 1 is large, the processings as shown in FIG. 8 are performed in view of the salient pole characteristic of which effect varies depending on the speed, thereby, a further accurate magnetic pole position detection can be realized. In response to the magnetic pole position θd outputted from the in-short circuit current difference phase calculation unit 22 the magnetic pole position estimation unit 23 feeds back the magnetic pole position θvp which was determined by the processings performed until the last time, thereby, a filtering with respect to noises is performed. In this instance, through performing positional compensation with respect to motor speed ω, varying magnetic pole position during one sampling period in which the processings are performed is taken into account. The detection use voltage generation unit 24 functions to output the detection use applied voltage Vp as shown in FIGS. 9A and 9B, and determines Vp according to the magnetic pole position θvp and d-axis voltage command value and q-axis voltage command value outputted from the current control unit 7. There are a variety of methods of determining Vp, however, in the present modification the calculation is performed so that Vp directs to the direction orthogonal to the voltage vector Vs as shown in FIGS. 9A through 9C, which is determined in a consideration that the absolute values of Va and Vb do not exceedingly increase.

Further, the third magnetic pole position detection unit 21 is a means for performing the magnetic pole position detection with a high accuracy when the motor speed ω increases. The fundamental principle of the present invention is to detect a magnetic pole position from variation of current which is in synchronism with the carrier waves and since the time interval for the current variation used for the calculation is short (for example, one cycle time of the carrier waves), therefore, it is assumed that during the short time interval the variation of the magnetic pole position is very small. However, when the motor speed increases exceedingly high, it sometimes happens that the magnetic pole position varies more than 10° during the short time interval. Therefore, when the motor speed ω is such high, the magnetic pole position is calculated by detecting the variation of the current difference vector due to variation of the position (phase) of the counter magnetomotive force without varying the applied voltage of which method is effective when the motor speed ω is high, because it is unnecessary to increase the applied voltage.

The third magnetic pole position detection unit 21 is constituted by an under flux rotation current difference phase calculation unit 25, a magnetic pole position estimation unit 26 and a detection use voltage generation unit 27. The detection use voltage generation unit 27, in practice, always outputs value 0. The under flux rotation current difference phase calculation unit 25 determines a difference between the current difference vectors Δia(2n) and Δib(2n+1), namely the current difference difference vector ΔΔi(2n), of which calculation itself is identical to that performed in the current difference difference vector phase calculation unit 15. Since the detection use voltage Vup, Vvp and Vwp are always 0, the current difference difference vector ΔΔi(2n) will primarily be 0. However, an averaged magnetic pole position from time t(2n) to time t(2n+1) and an averaged magnetic pole position from time t(2n+1) to time t(2n+2) are different, therefore, average counter electromotive forces Vemf(2n) and Vemf(2n+1) at the two time intervals are different. Accordingly, due to a difference between Vemf(2n+1) and Vemf(2n), in that counter electromotive force difference vector ΔVemf(2n) the current difference difference vector ΔΔi(2n) can not assume 0, but shows a certain amount of vector. Herein, the direction of Δemf(2n) is almost orthogonal to the direction of q-axis, in that in the direction of d-axis (in negative direction). Accordingly, the direction of ΔΔi(2n) also assumes the direction of ΔVemf(2n), in that d-axis direction (in negative direction thereof) −θd. Through the calculation of the direction of the current difference difference vector ΔΔi(2n) in this way, −θd can be obtained. The magnetic position estimation unit 26 performs a noise processing by making use of the magnetic pole position θ and −θd obtained by the last processings, and outputs a magnetic pole position θ. As has been explained, the third magnetic pole position detection unit 21 estimates the magnetic pole position by making use of the current difference vector induced by the rotation of magnetic fluxes without varying the applied voltage of which method is particularly effective for the detection of the magnetic pole position at the time of high speed rotation of the synchronous motor.

The calculation method change-over unit 18 estimates a motor speed ω based on the magnetic pole position θ (or θvp) obtained by the magnetic pole position estimation units and performs processing of selecting an optimum magnetic pole position estimation method in response to the estimated motor speed.

With the present embodiment, the magnetic pole position can always be detected in a moment with a high accuracy over a motor speed range from 0 to its maximum speed, thereby, a motor control system having a high response and high performance control property can be provided. Further, when a current sensor having an accurate current detection and less noise property is used, the magnetic pole position can be estimated in a moment for every one cycle of the carrier waves, while eliminating the filtering processing at the magnetic pole position estimation units 23 and 26. Further, in the combination of the magnetic pole position detection methods to be changed-over, a further magnetic pole position detection method which will be explained later can be included.

Figure 10:
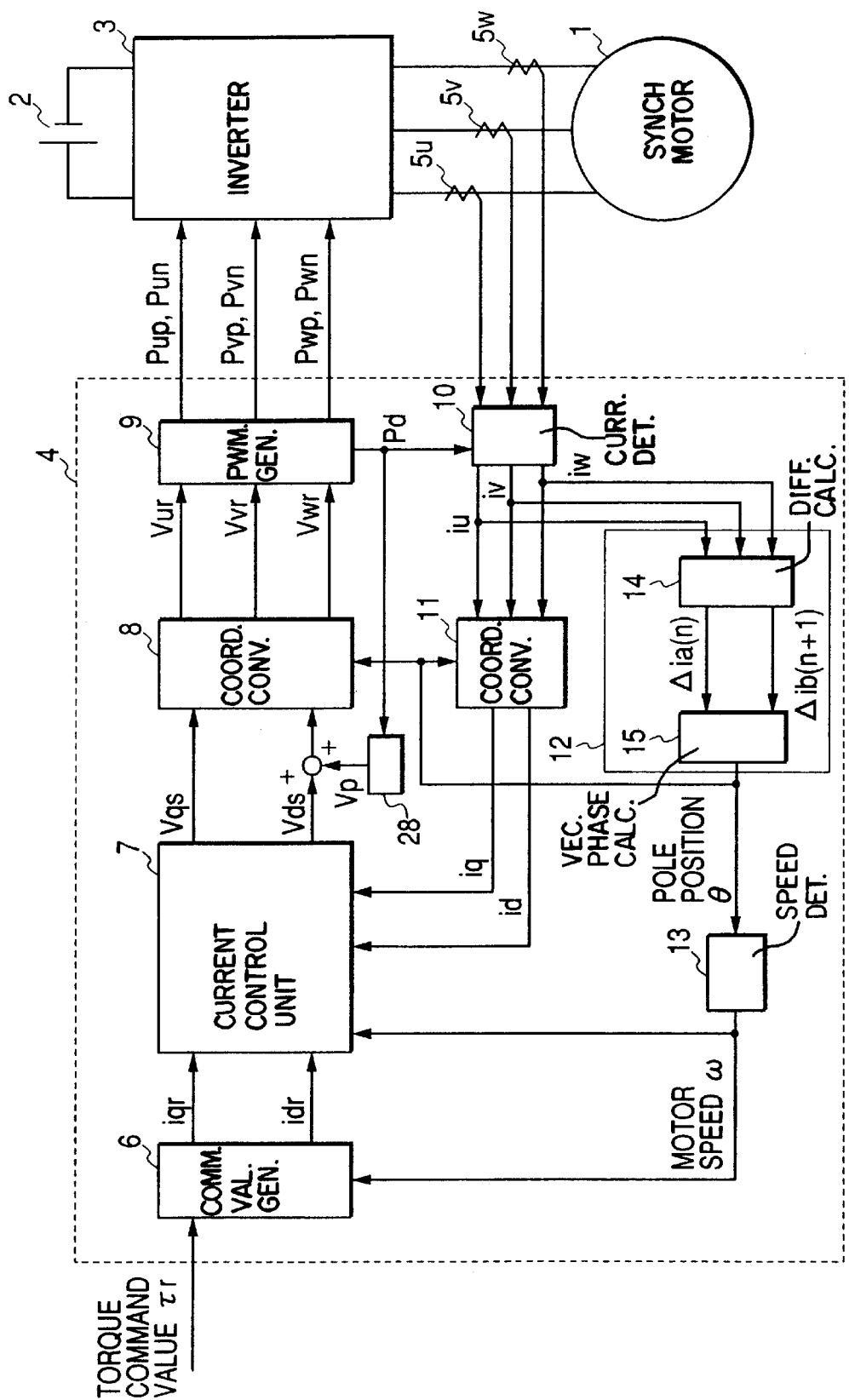
FIG. 10 is a block diagram of a magnetic pole position sensorless control system for a synchronous motor in which calculation method of magnetic pole position detection is simplified by varying d-axis voltage command.

FIG. 10 is still another embodiment showing a magnetic pole position detection method in which the calculation therefor is simplified. Primary differences of FIG. 10 embodiment from 1 and FIG. 5 embodiments are that the two current sensors are increased to three, the output Vp of the detection use voltage generation unit 28 is added to the d-axis voltage command, and the processing method in the magnetic pole position detection unit 12 is simplified. As has been explained in connection with FIG. 1 embodiment, when the phase currents iu and iv are detected, the W phase current iw can be determined from iu and iv, therefore, the detection of the W phase current iw can be omitted, however, in the present embodiment the W phase current iw is likely detected with a current sensor 5w. The current detection unit 10 samples the phase currents iu, iv and iw in response to the current detection pulses Pd and performs an offset compensation so as to keep the relationship iu+iv+iw=0. Thereby, offset errors in the current sensors can be compensated and a highly accurate magnetic pole position detection can be realized.

Now, the detection use voltage generation unit 28 representing features of the present embodiment will be explained. As has been explained in connection with FIG. 5 embodiment, the detection use applied voltage Vp is applied in positive and negative direction of an estimated d-axis in synchronism with the carrier waves. For this reason, in the detection use voltage generation unit 28 a process of adding the detection use applied voltage Vp of positive and negative values alternatively to the d-axis voltage Vds in response to the current detection pulses Pd.

The magnetic pole position detection unit 12 is constituted by the current difference calculation unit 14 and the current difference difference vector phase calculation unit 15 which have been explained in connection with FIG. 5 embodiment. In the current difference calculation unit 14, the current difference vector Δia(2n) during time from t(2n) to t(2n−1) and the current difference vector Δib(2n+1) during time from t(2n+1) to t(2n+2) are calculated respectively from the three phase currents iu, iv and iw, and are outputted to the current difference vector phase calculation unit 15. Subsequently, in the current difference difference vector phase calculation unit 15, the current difference difference vector ΔΔi(2n) is determined from a difference between Δib(2n+1) and Δia(2n), and the phase θip(2n) is calculated. The phase $\theta ip(2n)$ of $\Delta\Delta i(2n)$, as it is, is assumed as the magnetic pole position and is outputted to the coordinate conversion units 8 and 11 and the speed detection unit 13 so as to constitute the control system. In connection with FIG. 6 it has been explained that the phase $\theta ip(2n)$ of the current difference difference vector $\Delta\Delta i(2n)$ is closer to the actual d-axis with respect to the estimated d-axis direction to which the detection use voltage Vp is applied. Namely, with FIG. 10 embodiment, even if the originally set magnetic pole position 0 is deviated from the actual d-axis, by assuming the phase $\theta ip(2n)$ of the current difference difference vector $\Delta\Delta i(2n)$ as the magnetic pole position $\theta$, the phase $\theta ip(2n)$ gradually comes close to the d-axis and finally coincides with the d-axis. Once the magnetic pole position $\theta$ coincides in the controller, the controller can always and continuously detect the actual magnetic pole position, namely the d-axis.

With the present embodiment, the magnetic pole position detection can be performed through a more simplified calculation than the other calculation methods, therefore, a motor control system with more low cost can be provided. Further, such as a noise removal use low pass filter and the magnetic pole position estimation unit 16 can be added to the magnetic pole position detection unit 12 in FIG. 10.

Figure 11:
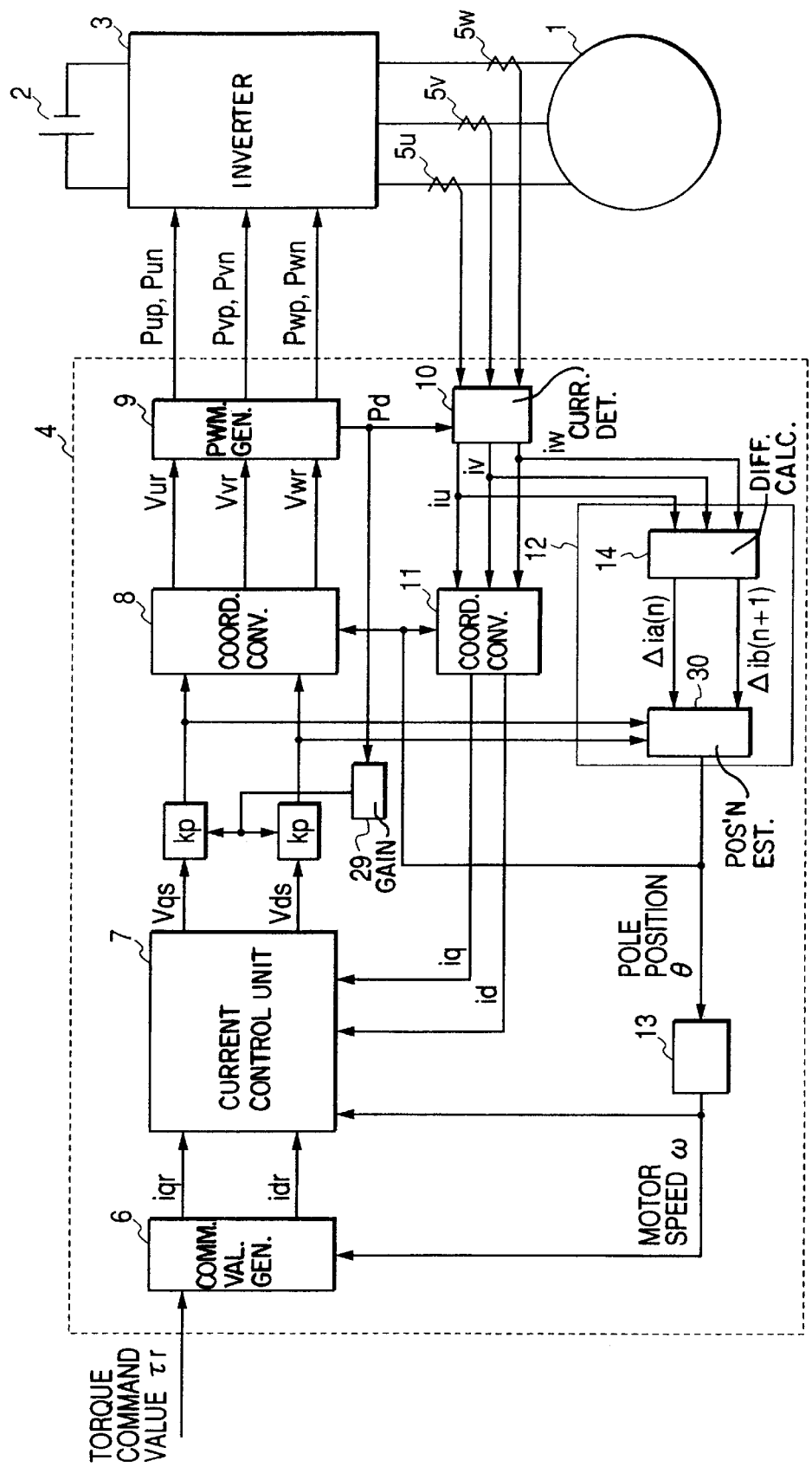
FIG. 11 is a block diagram of a magnetic pole position sensorless control system for a synchronous motor in which a magnetic pole position is estimated by detecting a counter electromotive force while varying the magnitude of voltage command value under in-phase condition.
Figure 13A:
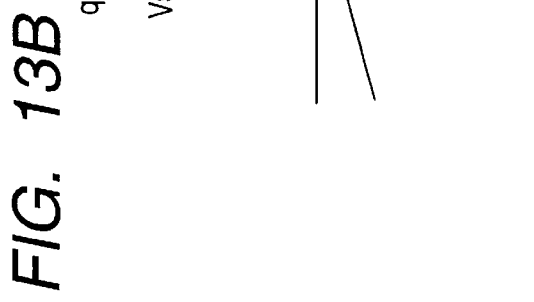
FIGS. 13A through 13D are voltage and current difference vector diagrams for a synchronous motor for explaining a principle performed in FIG. 11 embodiment.
Figure 13B:
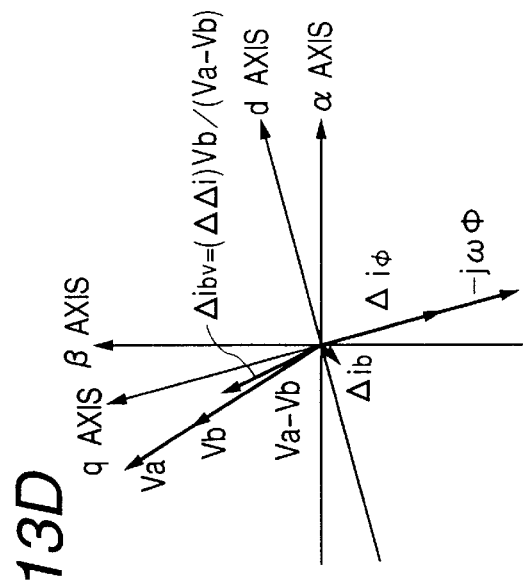
Figure 13C:
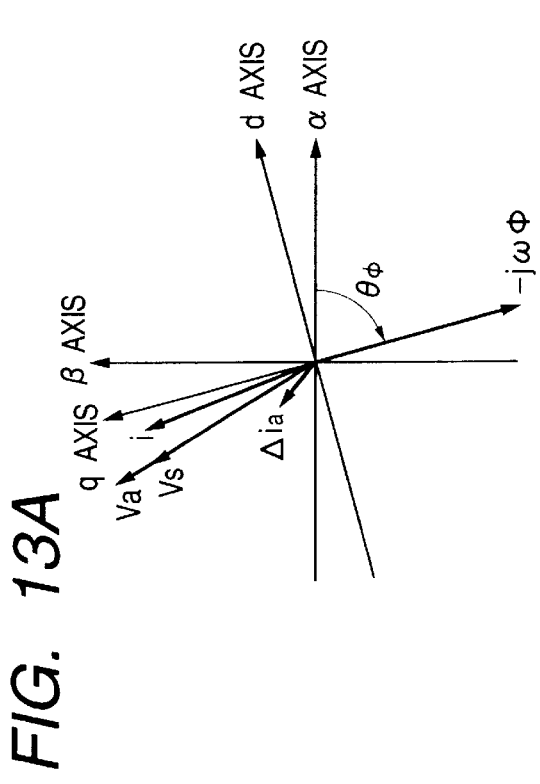
Figure 13D:
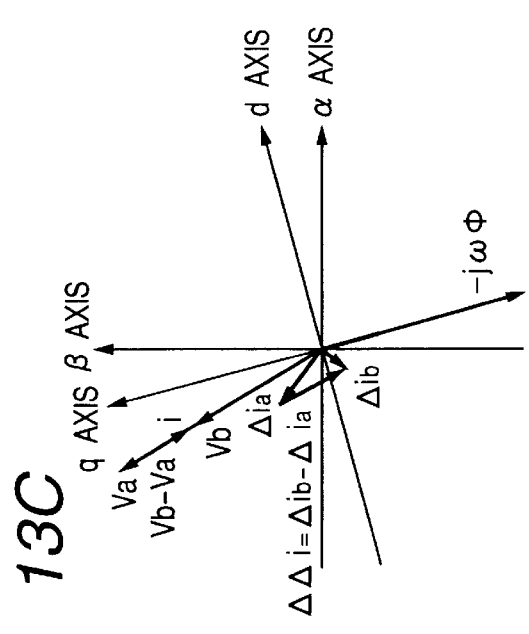

A further embodiment as shown in FIG. 11 through FIG. 13 relates to a method of estimating a magnetic pole position by making use of a counter electromotive force and is different from the embodiment as shown in FIG. 7 through FIG. 9. Primary features of FIG. 11 embodiment is that a voltage gain setting unit 29 is provided and a different calculation method is used in a magnetic pole position estimation unit 30. In the voltage gain setting unit 29, a value of voltage gain Kp is either increased or decreased in response to the current detection pulses Pd. For example, during time from t(2n) to t(2n+1) Kp is set larger than 1 and during time from t(2n+1) to t(2n+2) Kp is set smaller than 1. Thereby, d-axis voltage command value Vds and q-axis voltage command value Vqs respectively either increase or decrease depending on Kp. As shown in FIGS. 13A and 13B in vector diagrams, the voltage vector Va(2n) during time from t(2n) to t(2n+1) is in-phase with the voltage command vector Vs (vector sum of Vds and Vqs) and the absolute value thereof is larger than Vs, and the voltage vector Vb(2n+1) during time from t(2n+1) to t(2n+2) is in-phase with Vs and the absolute value thereof is smaller than Vs. When the value of Kp is, for example, set at 1.1 time and 0.9 time, an average value of Va(2n) and Vb(2n+1) can be set at Vs. The current difference vectors $\Delta ia(2n)$ and $\Delta ib(2n+1)$ in such exemplified instance are illustrated in FIGS. 13A and 13B. These vectors are affected not only by the applied voltage vectors Va(2n) and Vb(2n+1) but also by the counter electromotive force $(-j\omega\phi)$. Thus, the phase of the counter electromotive force is detected according to the method as shown in FIG. 12 flowchart. The magnetic pole position detection unit 12 as shown in FIG. 11 is constituted by the current difference calculation unit 14 and the magnetic pole position estimation unit 30. As has been explained in connection with FIG. 5 embodiment, the current difference calculation unit 14 calculates the current difference vectors $\Delta ia(2n)$ and $\Delta ib(2n+1)$, and these values are inputted into the magnetic pole position estimation unit 30 where the calculation according to FIG. 12 flowchart is performed. At first, by making use of $\Delta ia(2n)$ and $\Delta ib(2n+1)$ inputted at step 110 the current difference difference vector $\Delta\Delta i(2n)$ representing the difference between $\Delta ia(2n)$ and $\Delta ib(2n+1)$ is calculated at step 121. Since $\Delta\Delta i(2n)$ is a difference of current difference, an influence of the counter electromotive force can be eliminated, and which represents current difference vector determined by $\{Vb(2n+1)-Va(2n)\}$ of which vector relationship is shown in FIG. 13C. At the subsequent step 122, $\Delta\Delta i(2n)Vb/(Vb-Va)$ is calculated to determine the current difference vector $\Delta ibv(2n+1)$. The current difference vector $\Delta ibv(2n+1)$ is a current difference vector when Vb(2n+1) is applied under no counter electromotive force. At step 123, a difference between $\Delta ib(2n+1)$ and $\Delta ibv(2n+1)$ and the counter electromotive force current difference vector $\Delta i\phi$ are calculated. $\Delta ib(2n+1)$ is a current difference vector affected by Vb(2n+1) and the counter electromotive force, and $\Delta ibv(2n+1)$ is a current difference vector affected only by Vb(2n+1), therefore, the difference $\Delta i\phi$ therebetween is a component affected by the counter electromotive force of which vector diagram is shown in FIG. 13D. Accordingly, through calculation of the phase $\theta\phi$ of the counter electromotive force current difference vector $\Delta i\phi$ at step 124 q-axis (negative direction thereof) can be determined. At step 113 in FIG. 12 through adding $\pi/2$ [rad] to the phase $\theta\phi$ d-axis namely the magnetic pole position $\theta$ is obtained.

According to the present embodiment, only through the use of the voltage gain in place of the detection use applied voltage, the magnetic pole position detection can be realized as well as through a correct drawing of vector diagram of the current different vector the phase of the counter electromotive force can be easily detected.

Figure 14:
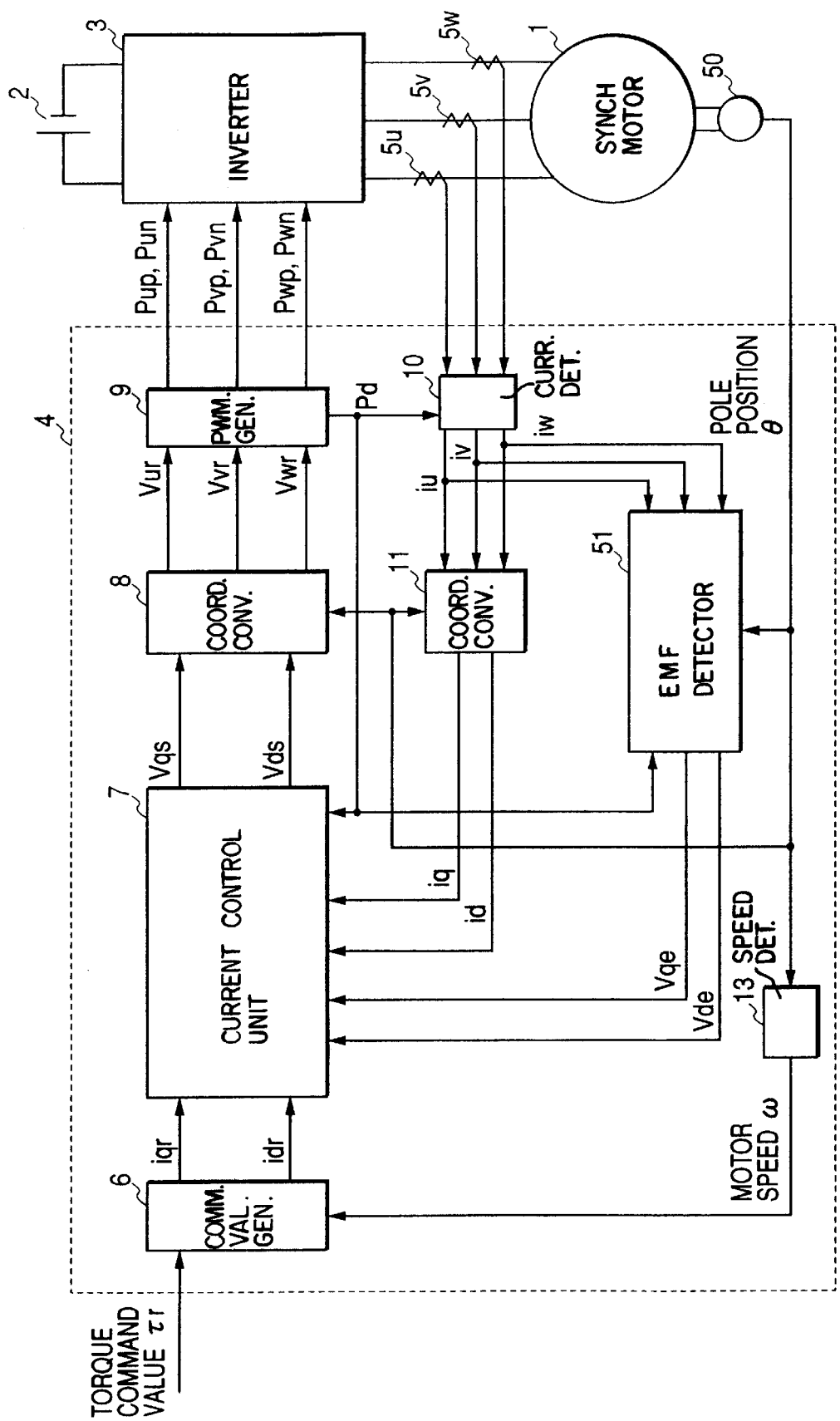
FIG. 14 is a control block diagram representing still another embodiment according to the present embodiment in which a characteristic of current control system is improved by detecting a counter electromotive force accurately.

FIG. 14 is a control block diagram showing a further embodiment in which the characteristic of the current control system is improved by correctly detecting the counter electromotive force. The present embodiment is directed to a motor control system including a magnetic pole position sensor 50 and is intended to realize a different object than that for the control systems with no magnetic pole sensors as has been explained. Therefore, the magnetic pole position $\theta$ detected by the magnetic pole position sensor 50 is outputted such as to the coordinate conversion units 8 and 11 and to the speed detection unit 13 so as to use the motor control. Primary differences other than the above performed in FIG. 14 embodiment are those in the current control unit 7 and in a counter electromotive force detection unit 51. In the counter electromotive force detection unit 51, d-axis and q-axis components Vde and Vqe in the counter electromotive force are calculated from the three phase currents iu, iv and iw and the magnetic pole position $\theta$. These values are inputted into the current control unit 7 and are used for counter electromotive force compensation in the current control system, thereby, a current control characteristic such as at a time of sudden speed change can be improved. Although it is well known through addition of the counter electromotive force components in the calculation for the current control system to compensate the counter electromotive force induced inside the synchronous motor 1, however, a method of estimating the counter electromotive force by the motor speed $\omega$ is generally used conventionally, therefore, the current frequency varies during speed variation due to excess or short compensation. Further, when the load includes a mechanical vibration system, the vibration may be amplified due to excess compensation. The present embodiment resolves these problems, and even at a time of sudden speed change the motor current can be controlled precisely along a current command value.

Figure 15:
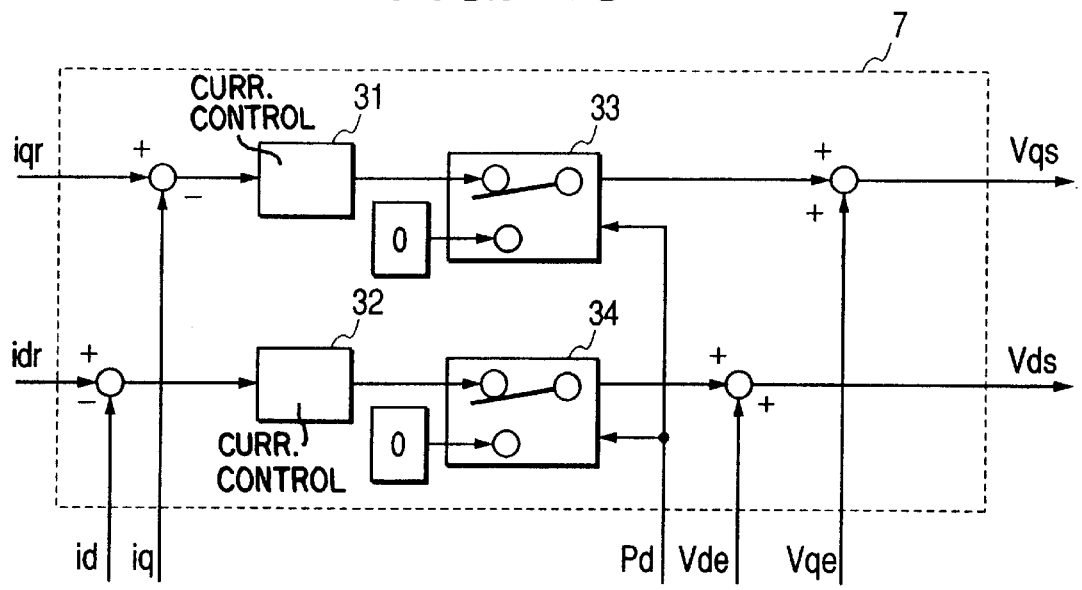
FIG. 15 is a block diagram showing processing contents performed in a current control unit 7 in FIG. 14 embodiment.
Figure 16:
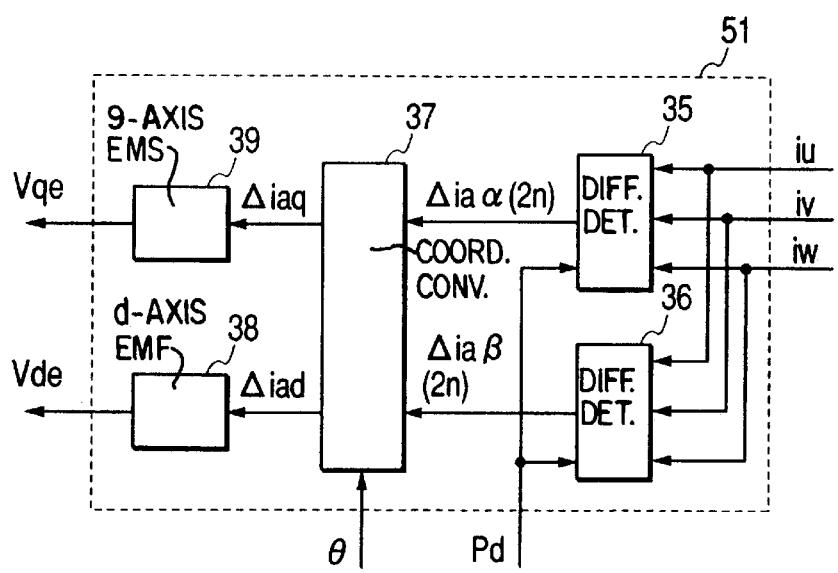
FIG. 16 is a block diagram showing processing contents performed in a counter electromotive force detection unit 51 in FIG. 15 embodiment.

Details of the above will be explained with reference to FIGS. 15 and 16. FIG. 15 is a block diagram showing processing contents performed in the current control unit 7 wherein valid/invalid of the current control system is changed over in response to the current detection pulses Pd. In FIG. 15, a d-axis current control calculation unit 31 and a q-axis current control calculation unit 32 respectively feed back d-axis current and q-axis current for d-axis and q-axis current command values idr and iqr and perform control calculation so as to assume their current deviations zero. In d-axis and q-axis change-over units 33 and 34, it is changed-over whether the calculation result of the d-axis and q-axis current control calculation units 31 and 32 is outputted or zero is outputted in response to the current detection pulses Pd. More specifically, during interval from time t(2n) to time t(2n+1) zero is outputted and during interval from time t(2n+1) to time t(2n+2) the current control calculation result is outputted. In other words, when seen the above from a point as a current control system only ½ voltage in average is outputted. Therefore, in this control system by doubling the normal gain of the current control system an equal current control characteristic can be ensured. d-axis and q-axis voltage command values Vds and Vqs are respectively obtained by adding d-axis and q-axis counter electromotive forces Vde and Vqe calculated at a counter electromotive force detection unit 51 to the outputs of the d-axis and q-axis change-over units 33 and 34. Now, the counter electromotive force detection unit 51 as shown in FIG. 16 will be explained. The counter electromotive force detection unit 51 is constituted by an α-axis current difference detection unit 35, a β-axis current difference detection unit 36, a coordinate conversion unit 37, a d-axis counter electromotive force calculation unit 38 and a q-axis counter electromotive force calculation unit 39. The α-axis current difference detection unit 35 and the β-axis current difference detection unit 36 are inputted of three phase currents iu, iv and iw and output a current difference vector Δia(2n) during interval from time t(2n) to time t(2n+1), in that an α-axis component Δiaα(2n) and a β-axis component Δiaβ(2n) in the current difference vector Δia(2n) are detected. These current difference values in the static coordinate system (α-β axes system) are converted into ones in the d-q axes rotary coordinate system to calculate d-axis component Δiad(2n) and q-axis component Δiaq(2n) in the current difference vector Δia(2n). It is important to note that Δiad(2n) and Δiaq(2n) are definitely d-axis and q-axis components in the current difference vector Δia(2n) when seen from the static coordinate system. Further, during interval from time t(2n) to time t(2n+1) the outputs of the d-axis and q-axis change-over units 33 and 34 are zero, therefore, only the d-axis and q-axis counter electromotive forces Vde and Vqe are respectively outputted as the d-axis and q-axis voltage command values Vds and Vqs. For this reason, when Vde is larger than the actual d-axis counter electromotive force of the synchronous motor 1, the d-axis current difference value Δiad assumes a positive value, and contrary, when Vde is smaller than the actual d-axis counter electromotive force, Δiad assumes a negative value. The same is true with regard to Vqe. Therefore, in the d-axis counter electromotive force calculation unit 38 and the q-axis counter electromotive force calculation unit 39, a calculation of the d-axis and q-axis counter electromotive forces Vde and Vqe is performed so that Δiad and Δiaq respectively assume zero. When both Δiad and Δiaq assume zero through this control calculation, it is implied that the d-axis and q-axis counter electromotive forces Vde and Vqe coincide with the actual counter electromotive forces of the synchronous motor 1. These d-axis and q-axis counter electromotive forces Vde and Vqe are outputted to the current control unit. The above is the control method according to the present embodiment.

When a counter electromotive force is estimated from a motor speed as in a conventional art, there occurs excess or shortage between the actual counter electromotive force and the estimated one, and which has caused to reduce performance of the current control system. On the other hand, when the voltage which fully coincides with the actual counter electromotive force is used as the compensation amount for the counter electromotive force as in the present method, a compensation for the primary counter electromotive force is fully achieved, thereby, the performance of the current control is always kept at a high level.

Figure 17:
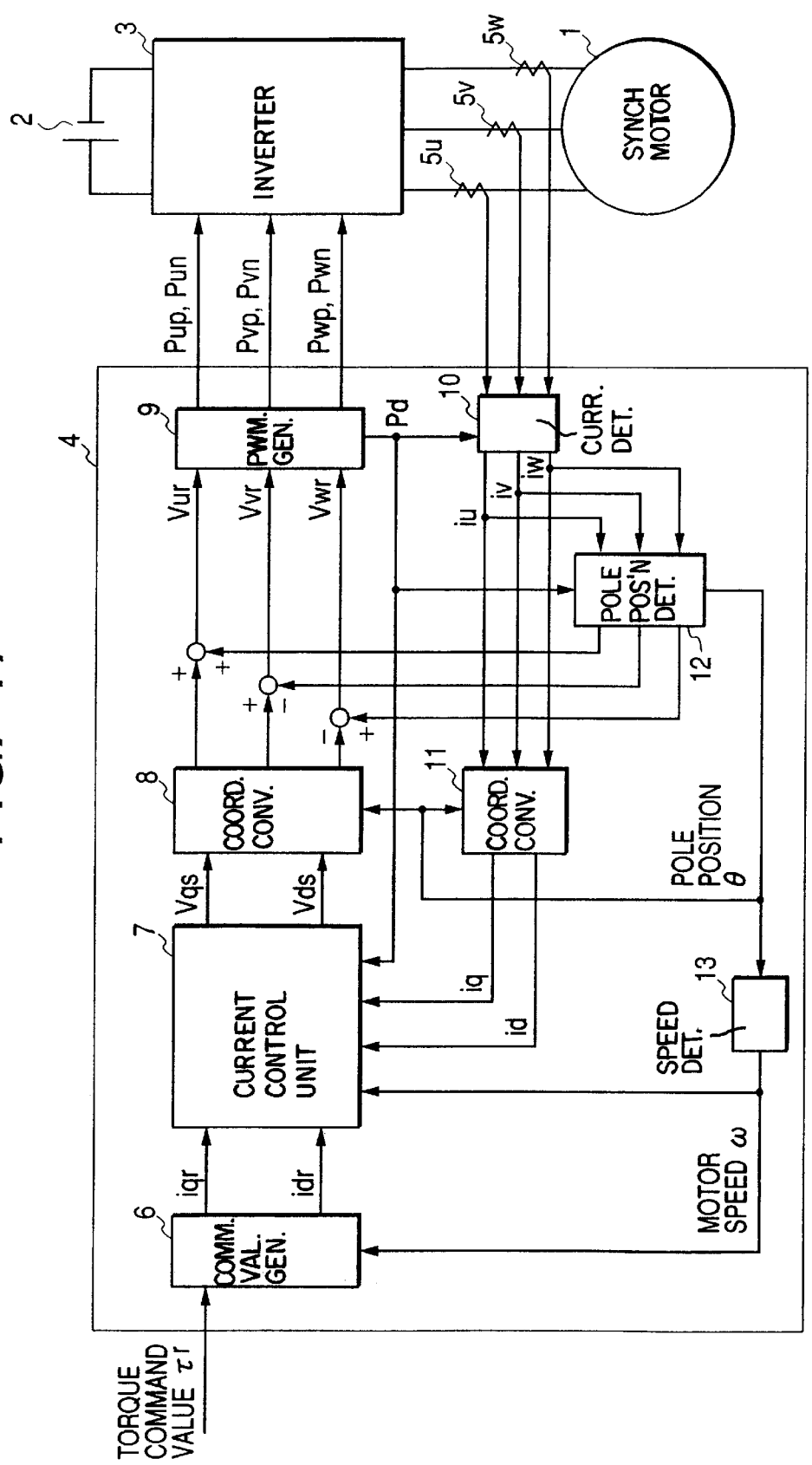
FIG. 17 is a block diagram of a motor control system representing a further embodiment according to the present invention in which a characteristic at a moment of motor speed sudden change is improved better than a conventional current control without using a magnetic pole position sensor.
Figure 18:
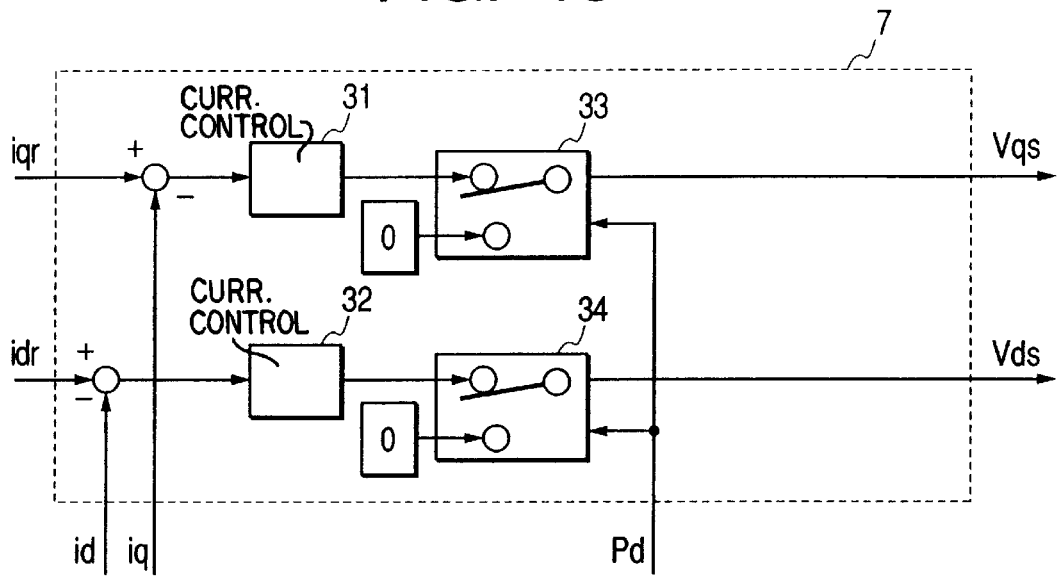
FIG. 18 is a block diagram of a current control unit 7 in FIG. 17 embodiment for explaining a calculation method performed therein.
Figure 19:
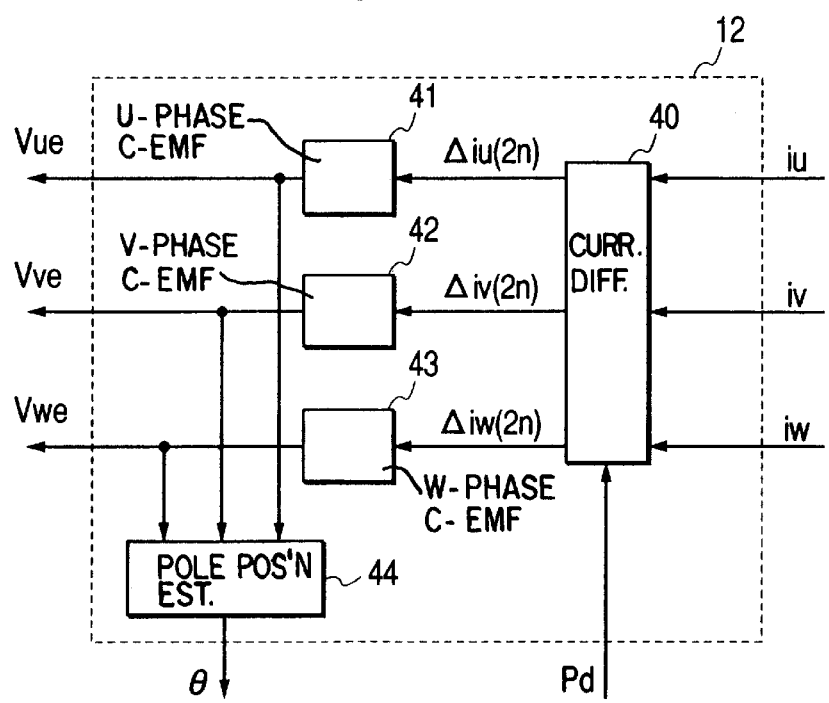
FIG. 19 is a block diagram of an embodiment of the magnetic pole position detector in FIG. 17.

FIG. 17 is a motor control system block diagram representing a further embodiment which improves the performance at a moment of motor speed sudden change in comparison with that of a conventional current control without using a magnetic pole position sensor. When comparing FIG. 17 embodiment with FIG. 14 embodiment, major differences are that the magnetic pole position sensor 50 is omitted, the detection of the magnetic pole position θ and the counter electromotive force is performed at the magnetic pole position detection unit 12 and the compensation for the counter electromotive force is performed by applying to the respective phase voltages in the static coordinate system other than the current control unit 7. The calculation method performed in the current control unit 7 in FIG. 17 is shown in block diagram in FIG. 18 which is substantially the same as with FIG. 15 embodiment and substantially the same calculation is performed therein. Only the difference of FIG. 17 embodiment from FIG. 15 embodiment is that the counter electromotive forces Vde and Vqe are not added, therefore, the detailed explanation of the structure is omitted. FIG. 19 shows a block diagram of the magnetic pole position detection unit 12 which performs an important process in the present embodiment. At first, in a current difference detection unit 40, respective phase current difference values Δiu(2n), Δiv(2n) and iw(2n) during interval from time t(2n) to time t(2n+1) are calculated in response to timing of the current detection pulses Pd. These values contain same information as in Δiad(2n) and Δiaβ(2n) as shown in FIG. 16. Even in FIG. 17 control system the inverter 3 is simply controlled by using respective counter electromotive forces Vue, Vve and Vwe as the applied voltages during interval from time t(2n) to time t(2n+1), therefore, U phase, V phase and W phase counter electromotive force calculation units 41, 42 and 43 perform calculation so that the respective current difference values Δiu(2n), Δiv(2n) and Δiw(2n) assume zero, of which idea is substantially the same as that for FIG. 14 embodiment. Subsequently, the phase θq (negative direction on q-axis) of the counter electromotive forces can be calculated based on the counter electromotive forces Vue, Vve and Vwe obtained at the U phase, V phase and W phase counter electromotive force calculation units 41, 42 and 43, which is performed by a magnetic pole position estimation unit 44 in FIG. 19. Accordingly, with FIG. 17 system a control system can be realized which always ensures a good current control performance without a magnetic pole sensor. In the present embodiment, FIG. 17 system is constituted by a method of using a counter electromotive force, however, a method can be applied which permits both to detect the magnetic pole position by making use of the salient pole property (the inverted salient pole property) and to keep the current control property by the counter electromotive force estimation.

In the above embodiments, a method of detecting the magnetic pole position of the synchronous motor by making use of only the current sensors has been explained. As has been explained, the present invention is applicable to the synchronous motor having both a cylindrical type rotor and a rotor having a salient pole property. Further, other than the synchronous motor, the present invention is also applicable to a reluctance motor while making use of its salient pole property. Further, although in order to avoid complexing explanation of the embodiments, an explanation on a calculation of the magnetic pole position in view of influences that the motor rotor rotates during sampling is omitted, however, such calculation can, of course, be included to the present embodiments. Further, in the present embodiments the method of detecting the magnetic pole position for every one cycle of the carrier waves has been explained, however, the detection can be realized in the same manner such as with a method of detecting the magnetic pole position by using current variation of one cycle in every plurality of cycles of the carrier waves and a method of detecting the magnetic pole position based on current variation for a unit of a plurality of cycles of the carrier waves. The present embodiments can be applied to such as an electric car and a hybrid car, besides when the present embodiments are applied to a magnet motor to which a sensorless control is now effected through an inverter control of 120° current conduction method, a sensorless system of no torque ripple and low noises can be provided through an inverter control of 180° current conduction method.

According to the present invention, only with current sensors the magnetic pole position can be detected on-line while performing the usual PWM control, thereby, a synchronous motor drive system with low noises and excellent torque control property can be provided with low cost without using a magnetic pole position sensor measuring a rotating position mechanically.

Further, in a case of using a usual magnetic pole position sensor a motor control system which always ensures a high current control performance by detecting a counter electromotive force in real time can be provided.

What is claimed is:

1. A device for controlling an AC motor, comprising:
  an electric power inverter which applies a voltage to the AC motor; and
  a control unit which controls the applied voltage with PWM signals in synchronism with carrier waves; wherein
    the motor control device further comprises a position estimation unit which estimates a position of a rotor of the AC motor based on a detection of current in the AC motor in synchronism with the carrier waves;
    the phases of the applied voltages which are modified are varied depending on operating states of the AC motor.

2. A device for controlling an AC motor, comprising:
  an electric power inverter which applies a voltage to the AC motor; and
  a control unit which controls the applied voltage with PWM signals in synchronism with carrier waves;
  wherein the motor control device further comprises a position estimation unit which estimates a position of a rotor of the AC motor through shifting the PWM signals within one cycle of the carrier waves from current variation amount of the AC motor.

3. A device for controlling an AC motor, comprising:
  an electric power inverter which applies a voltage to the AC motor; and
  a control unit which controls the applied voltage with PWM signals in synchronism with carrier waves;
  wherein the motor control device further comprises a current variation amount detection unit which detects current variation amount of the AC motor for every predetermined time in synchronism with the carrier waves and a position estimation unit which estimates a rotor position of the AC motor from a relationship between a plurality of the current variation amounts and a plurality of the applied voltages corresponding thereto.

4. A device for controlling an AC motor, comprising:
  an electric power inverter which applies a voltage to the AC motor; and
  a control unit which controls the applied voltage with PWIVL signals in synchronism with carrier waves;
  wherein the motor control device further comprises a voltage addition unit which adds a detection use voltage in a direction of estimated magnetic pole position (d-axis) in synchronism with the carrier waves, a current variation amount detection unit which detects current variation amount of the AC Motor for every predetermined time in synchronism with the carrier waves and a position estimation unit which estimates a rotor position of the AC motor from a plurality of the current variation amounts.

5. A device for controlling an AC motor, comprising:
  an electric power inverter which applies voltage to the AC motor; and
  a control unit which controls the applied voltage with PWM signals;
  wherein the motor control device further comprises a position estimation unit which estimates a position of a rotor of the AC motor by applying applied voltages having different phases in vector, a plurality of times, and by detecting counter electromotive forces from current variation amounts of the AC motor for respective voltage applications.

6. A device for controlling an AC motor, comprising:
  an electric power inverter which applies voltage to the AC motor; and
  a control unit which controls the applied voltage with PWM signals;
  wherein the motor control device further comprises a position estimation unit which estimates a position of a rotor of the AC motor by applying applied voltages having the same phase in vector and different magnitude, a plurality of times, and by detecting counter electromotive forces from the current variation amounts of the AC motor for the respective voltage applications.

7. A device for controlling an AC motor, comprising:
  an electric power inverter which applies voltage to the AC motor; and
  a control unit which controls the applied voltage with PWM signals;
  wherein the motor control device further comprises a position estimation unit which estimates a position of a rotor of the AC motor by controlling phases of applied voltages so that a phase difference of the current variation amounts of the AC motor with respect to the applied voltages assumes either 0° or 180°.

8. A device for controlling an AC motor, comprising:
  an electric power inverter which applies voltage to the AC motor; and
  a control unit which controls the applied voltage with PWM signals;
  wherein the motor control device further comprises a position estimation unit which estimates a position of a rotor of the AC motor by controlling applied voltages so that the current variation amounts of the AC motor with respect to the applied voltages assumes 0.

9. A device for controlling an AC motor, comprising:

an electric power inverter which applies voltage to the AC motor; and a control unit which controls the applied voltage with PWM signals;

wherein the motor control device further comprises a current variation control unit which controls the voltage so that current variation amounts of the AC motor assumes a value of 0 in a predetermined section.

10. The device according to claim 9, wherein the current variation control unit either detects or compensates counter electromotive forces of the AC motor.

11. A device for controlling an AC motor, comprising:

an electric power inverter which applies a voltage to the AC motor; and a control unit which controls the applied voltage with PWM signals;

wherein the motor control device further comprises a phase shifting means which shifts the PWM signals within one cycle of carrier waves.

12. A device for controlling an AC motor, comprising:

an electric power inverter which applies a voltage to the AC motor; and a control unit which controls the applied voltage with PWM signals in synchronism with carrier waves;

wherein the motor control device further comprises a position estimation unit which estimates a position of a rotor of the AC motor based on a detection of current in the AC motor in synchronism with the carrier waves; and the PWM signals are shifted so that a section for detecting current assumes a 0 voltage vector state.

13. A device for controlling an AC motor, comprising:

an electric power inverter which applies a voltage to the AC motor; and a control unit which controls the applied voltage with PWM signals in synchronism with carrier waves;

wherein the motor control device further comprises a position estimation unit which estimates a position of a rotor of the AC motor based on a detection of current in the AC motor in synchronism with the carrier waves; and the rotor position is detected by controlling applied voltages so that a phase of a current variation amount difference vector coincides with a difference vector of the applied voltage.

* * * * *